United States Patent
Sadek

(10) Patent No.: US 10,791,027 B2
(45) Date of Patent: Sep. 29, 2020

(54) METHODS AND APPARATUS FOR ASSISTED RADIO ACCESS TECHNOLOGY SELF-ORGANIZING NETWORK CONFIGURATION

(71) Applicant: QUALCOMM Incorporated, San Diego, CA (US)

(72) Inventor: Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 15/923,808

(22) Filed: Mar. 16, 2018

(65) Prior Publication Data

US 2018/0205609 A1    Jul. 19, 2018

Related U.S. Application Data

(62) Division of application No. 14/514,776, filed on Oct. 15, 2014, now Pat. No. 9,979,597.
(Continued)

(51) Int. Cl.
    *H04W 88/06*     (2009.01)
    *H04W 72/04*     (2009.01)
    (Continued)

(52) U.S. Cl.
    CPC ....... *H04L 41/0823* (2013.01); *H04B 17/318* (2015.01); *H04B 17/345* (2015.01);
    (Continued)

(58) Field of Classification Search
    CPC . H04W 72/1215; H04W 88/06; H04W 16/14; H04W 36/0005; H04W 52/244;
    (Continued)

(56) References Cited

U.S. PATENT DOCUMENTS

| 6,072,690 A | 6/2000 | Farooq et al. |
| 8,693,950 B2 * | 4/2014 | Desai ............... H04W 52/242 455/41.2 |

(Continued)

FOREIGN PATENT DOCUMENTS

| JP | 2012-190862 A | 10/2012 |
| WO | WO-2011/085192 A1 | 7/2011 |

(Continued)

OTHER PUBLICATIONS

Taiwan Search Report—TW104109400—TIPO—dated Jan. 15, 2019.
International Search Report and Written Opinion—PCT/US2015/021626—ISA/EPO—dated Jul. 9, 2015. 11 pages.

*Primary Examiner* — Sai Aung
(74) *Attorney, Agent, or Firm* — Arent Fox, LLP

(57) ABSTRACT

The present methods and apparatus relate to managing interference associated with a configuration of a self-organizing network (SON) during wireless communication, comprising receiving, at a first radio access technology (RAT) entity, measurement information from a user equipment (UE) for assisting with interference management at a second RAT entity, wherein the first RAT entity is collocated with the second RAT entity; and configuring the second RAT entity based at least in part on the measurement information received by the first RAT entity. In a further aspect, the present methods and apparatus comprise embedding, by a first RAT entity, RAT entity-specific information of a second RAT entity in a management indication, wherein the first RAT entity and the second RAT entity are collocated; and transmitting the management indication to one or both of a UE and another first RAT entity.

24 Claims, 16 Drawing Sheets

Related U.S. Application Data

(60) Provisional application No. 61/975,574, filed on Apr. 4, 2014.

(51) Int. Cl.
*H04L 12/24* (2006.01)
*H04W 24/02* (2009.01)
*H04B 17/318* (2015.01)
*H04B 17/345* (2015.01)
*H04W 28/02* (2009.01)
*H04W 84/18* (2009.01)

(52) U.S. Cl.
CPC ....... *H04W 24/02* (2013.01); *H04W 28/0236* (2013.01); *H04W 84/18* (2013.01)

(58) Field of Classification Search
CPC ............... H04W 24/08; H04W 52/242; H04W 72/0446; H04W 72/082; H04W 72/042
See application file for complete search history.

(56) References Cited

U.S. PATENT DOCUMENTS

| | | | |
|---|---|---|---|
| 8,750,926 B2* | 6/2014 | Fu | H04W 36/0005 455/553.1 |
| 8,838,046 B2* | 9/2014 | Fu | H04B 1/406 455/67.13 |
| 9,253,698 B2 | 2/2016 | Zhang et al. | |
| 2004/0183171 A1 | 9/2004 | Breisch et al. | |
| 2010/0039099 A1 | 2/2010 | Kim et al. | |
| 2012/0164948 A1 | 6/2012 | Narasimha et al. | |
| 2012/0304213 A1 | 11/2012 | Lee et al. | |
| 2013/0028177 A1 | 1/2013 | Koskela et al. | |
| 2013/0044621 A1 | 2/2013 | Jung et al. | |
| 2013/0090142 A1* | 4/2013 | Lee | H04B 1/0475 455/501 |
| 2013/0114583 A1* | 5/2013 | Park | H04W 52/0216 370/338 |
| 2013/0130681 A1* | 5/2013 | Lee | H04W 76/15 455/434 |
| 2013/0170362 A1 | 7/2013 | Futaki et al. | |
| 2013/0208587 A1* | 8/2013 | Bala | H04W 16/14 370/230 |
| 2013/0225149 A1 | 8/2013 | Sadek et al. | |
| 2013/0242897 A1 | 9/2013 | Meylan et al. | |
| 2013/0272260 A1 | 10/2013 | Bitran et al. | |
| 2013/0273857 A1* | 10/2013 | Zhang | H04L 1/06 455/73 |
| 2014/0010162 A1 | 1/2014 | Cho et al. | |
| 2014/0128115 A1 | 5/2014 | Siomina et al. | |
| 2014/0187249 A1* | 7/2014 | Fu | H04B 1/406 455/443 |
| 2015/0063150 A1 | 3/2015 | Sadek et al. | |
| 2015/0105122 A1 | 4/2015 | Wei et al. | |
| 2015/0288566 A1 | 10/2015 | Sadek | |

FOREIGN PATENT DOCUMENTS

| | | |
|---|---|---|
| WO | WO-2011/095687 A1 | 8/2011 |
| WO | WO-2012/014014 A2 | 2/2012 |
| WO | WO-2013/006199 A1 | 1/2013 |
| WO | 2013179095 A1 | 12/2013 |

* cited by examiner

METHODS AND APPARATUS FOR ASSISTED RADIO ACCESS TECHNOLOGY SELF-ORGANIZING NETWORK CONFIGURATION

CROSS-REFERENCE TO RELATED APPLICATION(S)

The present Application for Patent is a divisional of U.S. patent application Ser. No. 14/514,776 entitled "METHODS AND APPARATUS FOR ASSISTED RADIO ACCESS TECHNOLOGY SELF-ORGANIZING NETWORK CONFIGURATION" filed Oct. 15, 2014, which claims priority to U.S. Provisional Application No. 61/975,574 entitled "METHODS AND APPARATUS FOR ASSISTED RADIO ACCESS TECHNOLOGY SELF-ORGANIZING NETWORK CONFIGURATION" filed Apr. 4, 2014, and assigned to the assignee hereof. This application incorporates by reference the entireties of those applications.

BACKGROUND

Aspects of the present disclosure relate generally to wireless communication, and more particularly, to methods and apparatus for assisting radio access technology self-organizing network configuration.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

In some wireless communication networks, a user equipment (UE) selects and maintains a connection with a base station providing communication capabilities for the UE. Further, in such wireless communication systems, small cells are deployed to improve wireless network communications when experiencing poor base station (e.g., Home Node B) connections. In such wireless communication networks, inefficient utilization of available communication resources, particularly identification resources for cell configurations, may lead to degradations in wireless communication. Even more, the foregoing inefficient resource utilization inhibits network devices from achieving higher wireless communication quality. In view of the foregoing, it may be understood that there may be significant problems and shortcoming associated with current self-organizing network configurations. Thus, improvements in self-organizing networks are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present methods relates to managing interference associated with a configuration of a self-organizing network (SON) during wireless communication, comprising receiving, at a first radio access technology (RAT) entity, measurement information from a user equipment (UE) for assisting with interference management at a second RAT entity, wherein the first RAT entity is collocated with the second RAT entity; and configuring the second RAT entity based at least in part on the measurement information received by the first RAT entity.

The present computer-readable medium storing computer executable code relates to managing interference associated with a configuration of a SON during wireless communication, comprising code for receiving, at a first RAT entity, measurement information from a UE for assisting with interference management at a second RAT entity, wherein the first RAT entity is collocated with the second RAT entity; and code for configuring the second RAT entity based at least in part on the measurement information received by the first RAT entity.

The present apparatus relates to managing interference associated with a configuration of a SON during wireless communication, comprising means for receiving, at a first RAT entity, measurement information from a UE for assisting with interference management at a second RAT entity, wherein the first RAT entity is collocated with the second RAT entity; and means for configuring the second RAT entity based at least in part on the measurement information received by the first RAT entity.

The present apparatus relates to managing interference associated with a configuration of a SON during wireless communication, comprising a first RAT entity configured to receive measurement information from a UE for assisting with interference management at a second RAT entity, wherein the first RAT entity is collocated with the second RAT entity; and a first management component configured to configure the second RAT entity based at least in part on the measurement information received by the first RAT entity.

In a further aspect, the present methods relates to managing interference associated with a configuration of a SON during wireless communication, comprising embedding, by a first RAT entity, RAT entity-specific information of a second RAT entity in a management indication, wherein the first RAT entity and the second RAT entity are collocated; and transmitting the management indication to one or both of a UE and another first RAT entity.

In a further aspect, the present computer-readable medium storing computer executable code relates to managing interference associated with a configuration of a SON during wireless communication, comprising code for embedding, by a first RAT entity, RAT entity-specific information of a second RAT entity in a management indication, wherein the first RAT entity and the second RAT entity are collocated; and code for transmitting the management indication to one or both of a UE and another first RAT entity.

In a further aspect, the present apparatus relates to managing interference associated with a configuration of a SON during wireless communication, comprising means for embedding, by a first RAT entity, RAT entity-specific information of a second RAT entity in a management indication, wherein the first RAT entity and the second RAT entity are collocated; and means for transmitting the management indication to one or both of a UE and another first RAT entity.

In a further aspect, the present apparatus relates to managing interference associated with a configuration of a SON during wireless communication, comprising a first RAT entity configured to embed RAT entity-specific information of a second RAT entity in a management indication, wherein the first RAT entity and the second RAT entity are collocated; and a second management component configured to transmit the management indication to one or both of a UE and another first RAT entity.

In another aspect, the methods relates to managing interference associated with a configuration of a SON during wireless communication, comprising measuring a signal strength value corresponding to a management indication received from a first RAT entity for assisting with interference management at a second RAT entity, wherein the first RAT entity is collocated with the second RAT entity; and transmitting measurement information to the first RAT entity for use in configuration of the second RAT entity.

In another aspect, a computer-readable medium storing computer executable code relates to managing interference associated with a configuration of a SON during wireless communication, comprising code for measuring a signal strength value corresponding to a management indication received from a first RAT entity for assisting with interference management at a second RAT entity, wherein the first RAT entity is collocated with the second RAT entity; and code for transmitting measurement information to the first RAT entity for use in configuration of the second RAT entity.

In another aspect, an apparatus relates to managing interference associated with a configuration of a SON during wireless communication, comprising means for measuring a signal strength value corresponding to a management indication received from a first RAT entity for assisting with interference management at a second RAT entity, wherein the first RAT entity is collocated with the second RAT entity; and means for transmitting measurement information to the first RAT entity for use in configuration of the second RAT entity.

In another aspect, an apparatus for managing interference associated with a configuration of a SON during wireless communication, comprising a measurement component configured to measure a signal strength value corresponding to a management indication received from a first RAT entity for assisting with interference management at a second RAT entity, wherein the first RAT entity is collocated with the second RAT entity; and wherein the measurement component is further configured to transmit measurement information to the first RAT entity for use in configuration of the second RAT entity.

In a further aspect, the methods relates to managing interference associated with a configuration of a self-organizing network (SON) during wireless communication, comprising receiving, by a first radio access technology (RAT) entity of a first small cell, a first RAT entity identification (ID) corresponding to a first RAT entity of a network device; and mapping the first RAT entity ID to a second RAT entity ID corresponding to a collocated second RAT entity of the network device, wherein measurement information received with the first RAT entity ID at the first RAT entity of the first small cell is used for assisting with interference management at a collocated second RAT entity of the first small cell.

In a further aspect, a computer-readable medium storing computer executable code relates to managing interference associated with a configuration of a self-organizing network (SON) during wireless communication, comprising code for receiving, by a first radio access technology (RAT) entity of a first small cell, a first RAT entity identification (ID) corresponding to a first RAT entity of a network device; and code for mapping the first RAT entity ID to a second RAT entity ID corresponding to a collocated second RAT entity of the network device, wherein measurement information received with the first RAT entity ID at the first RAT entity of the first small cell is used for assisting with interference management at a collocated second RAT entity of the first small cell.

In a further aspect, an apparatus relates to managing interference associated with a configuration of a self-organizing network (SON) during wireless communication, comprising means for receiving, by a first radio access technology (RAT) entity of a first small cell, a first RAT entity identification (ID) corresponding to a first RAT entity of a network device; and means for mapping the first RAT entity ID to a second RAT entity ID corresponding to a collocated second RAT entity of the network device, wherein measurement information received with the first RAT entity ID at the first RAT entity of the first small cell is used for assisting with interference management at a collocated second RAT entity of the first small cell.

In a further aspect, an apparatus relates to managing interference associated with a configuration of a self-organizing network (SON) during wireless communication, comprising a first radio access technology (RAT) entity of a first small cell configured to receive a first RAT entity identification (ID) corresponding to a first RAT entity of a network device; and wherein the first RAT entity of the first small cell is further configured to map the first RAT entity ID to a second RAT entity ID corresponding to a collocated second RAT entity of the network device, wherein measurement information received with the first RAT entity ID at the first RAT entity of the first small cell is used for assisting with interference management at a collocated second RAT entity of the first small cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of the present disclosure, reference is now made to the accompanying drawings, in which like elements are referenced with like numerals, and where dashed lines may indicate optional components or actions. These drawings should not be construed as limiting the present disclosure, but are intended to be illustrative only.

DETAILED DESCRIPTION

Figure 1:
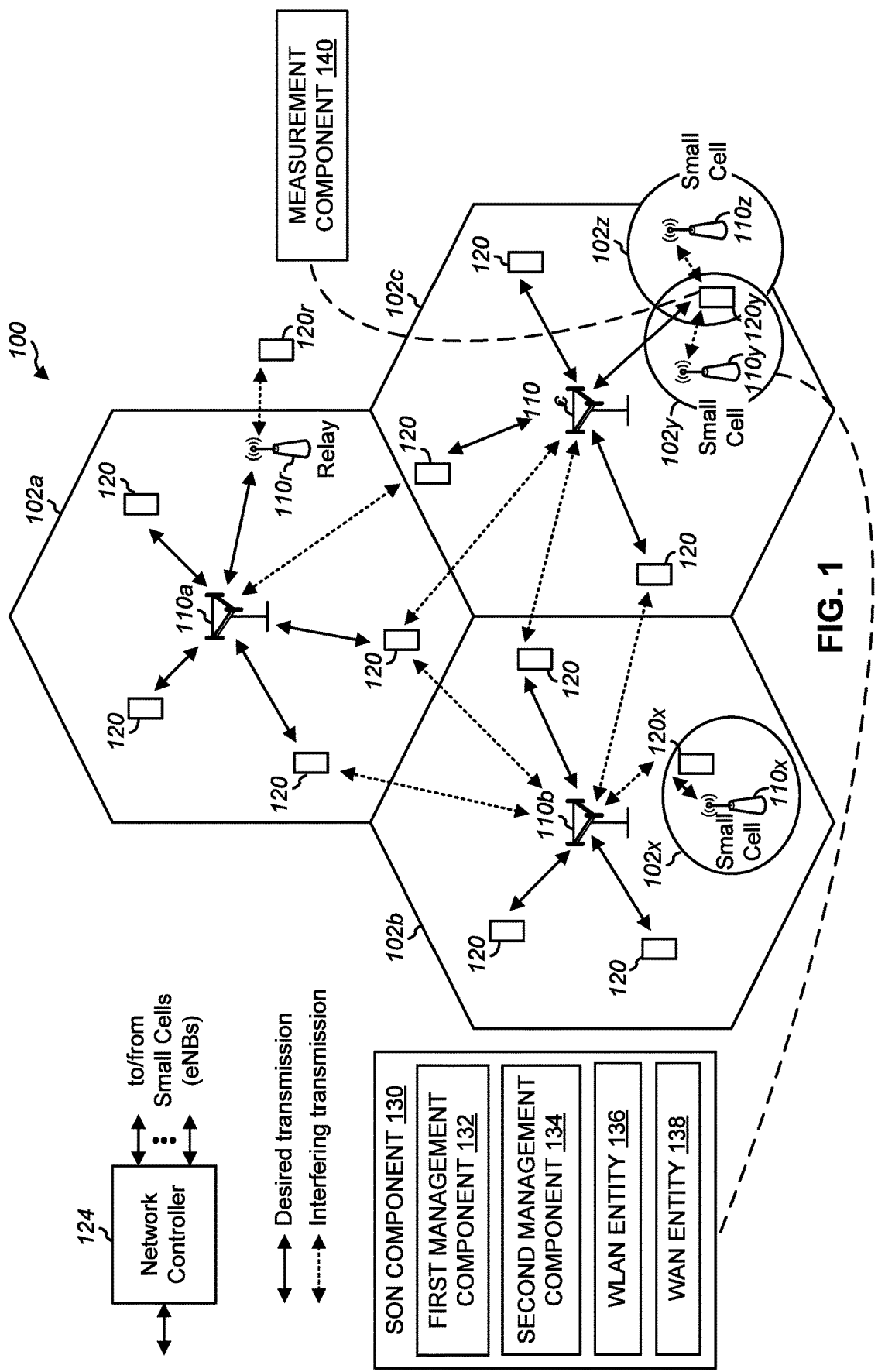
FIG. 1 is a block diagram conceptually illustrating an example of a telecommunications system in accordance with an aspect of the self-organizing network (SON) component and the measurement component.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known components are shown in block diagram form in order to avoid obscuring such concepts. In an aspect, the term "component" as used herein may be one of the parts that make up a system, may be hardware or software, and may be divided into other components.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

The present aspects generally relate to the use of a wireless local area network (WLAN) to assist in the configuration of wireless wide area network (WAN or WWAN) self-organizing network (SON). SON may simplify and automate the initial provisioning, in operation optimization, and maintenance of mobile networks. However, in some wireless communication systems, WAN-configured SON entities deployed in dense communication environments may experience difficulties in obtaining a number of measurements used for SON. For example, a WAN entity such as a small cell communicating according to long term evolution (LTE) may find it difficult to obtain certain measurement information from a user equipment (UE).

Specifically, in dense communication environments comprising a number of small cells, a WAN entity (e.g., associated with/used for an LTE SON) at a small cell may be operating using the same or similar time/frequency characteristics as a WAN entity at one or more neighboring small cells. Hence, such dense communication environments may exhibit higher levels of interference due to, for instance, pilot pollution by the WAN entities of the one or more small cells. For example, if there are more than two cells (besides the strongest cell) within a certain frequency of the strongest cell then there is pilot pollution. Accordingly, the UE may be unable to obtain reliable measurement information for subsequent transmission to a WAN entity (e.g., LTE SON). Even more, in multi-radio access technology (RAT) small cell deployments employing collocated WAN and WLAN (e.g., Wi-Fi) entities, the WLAN entity, although capable of transmitting and receiving measurement information to and from the UE, such information, which may be particularly useful to the WAN entity for interference management and/or SON purposes, may nonetheless be neglected for such purposes.

Accordingly, in some aspects, the present methods and apparatus may provide an efficient and effective solution, to provide a WLAN-assisted WAN SON entity at one or more small cells employing collocated WLAN and WAN entities. In an aspect, the present apparatus and methods may provide an assisted WAN SON solution by utilizing a collocated WLAN entity to receive measurement information from a UE. The measurement information may correspond to or otherwise be indicative of UE measurements of one or more WLAN communication characteristics. For example, the WLAN entity may transmit a beacon signal/indication to assist with WLAN locating and connection. The UE may measure a signal strength metric of the beacon signal/indication such as, but not limited hereto, a received signal strength indicator (RSSI) to determine, among other communication characteristics, the pathloss between the WLAN entity and the UE.

For example, the UE may not be able to detect the WAN entity of a small cell directly due to high interference from WAN entities of other small cells using the same or similar time and/or frequency resources. Further, the UE may readily detect WLAN entity collocated with the WAN entity at the small cell as the WLAN entity may operate in an unlicensed band which has multiple frequencies that help reduce interference. Moreover, WLAN medium access control (MAC) entity may use carrier sensing multiple access (CSMA), which may enable listen-before-talk aspects to reduce a collision probability between WLAN entities.

Additionally, the present aspects may include a WLAN entity which may embed RAT entity-specific information in the one or more beacon indications, such as, but not limited to, a load level value of the WAN entity, a number of serving UEs, quality of service information, carrier type information, scheduling information, priority level information, allowable interference level value, coexistence parameters such as power backoff, time division multiplexing (TDM) and/or frequency division multiplexing (FDM) configuration, fractional frequency reuse configuration, and one or more mobility related parameters. The RAT entity-specific information may be used for interference management, mobility management, and/or self-configuration by the WAN SON entity (e.g., transmission power adjustment and/or resource adjustment).

In other words, the present aspects may embed RAT entity-specific information corresponding or otherwise related to a second RAT entity (e.g., WAN entity) into a first RAT entity beacon. As such, the UE may then provide corresponding measurement information for use in subsequent WAN SON entity assisted determinations. In other aspects, a WLAN entity of a neighboring small cell may detect and provide measurement information to the WLAN entity of the small cell responsible for embedding the RAT entity-specific information. Specifically, in one example, a pathloss of the WAN entity may be determined based at least in part on the pathloss of the first RAT entity (e.g., WLAN entity) and a correction factor value. In such aspects, the correction factor value may be a function of at least a frequency of the second RAT entity (e.g., WAN entity). As such, the present apparatus and methods provide a WLAN assisted solution for assisting with interference management at a second RAT entity in dense small cell environments.

FIG. 1 is a block diagram conceptually illustrating an example of a telecommunications network system 100 in accordance with an aspect of the present disclosure. Telecommunications network system 100 may include one or more network entities 110, for example, one or more small cells. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell.

For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell.

Each small cell 110 (e.g., small cell 110y) may include SON component 130, which may be configured to autonomously manage interference that arises because of signals from two or more small cells. Further, for instance, SON component 130, which may be included in each small cell 110 illustrated in FIG. 1, may be configured to receive measurement information at a first RAT entity. In other words, SON component 130 may be configured to manage interference at a second RAT entity (e.g., WAN entity 138) based on measurement information received at a first RAT entity (e.g., WLAN entity 136). Such interference management may be accomplished by one or both of first management component 132 and second management component 134.

Additionally, small cell 110y may be configured to facilitate communication with a network via two or more wireless RAT protocols. In other words, small cell 110y may be configured to include both a first RAT entity in the form of WLAN entity 136 and a second RAT entity in the form of WAN entity 138. Hence, small cell 110y may, in some aspects, communicate according to a multi-RAT scheme. In some aspects, WAN entity 138 may include a radio that communicates according to at least one technology such as, but not limited to, long term evolution (LTE), universal mobile telecommunications system (UMTS), code division multiple access (CDMA) 2000. In additional aspects, WLAN entity 136 may include a radio that communicates according to at least one technology such as, but not limited to Wi-Fi.

Further, one or both of WLAN entity 136 and WAN entity 138 may be configured to perform autonomous functions according to SON mechanisms. For instance, WAN entity 138 may alternatively be referred to as a WAN SON entity 138, which may be configured to self-organize according to a distributed, centralized, and/or hybrid architecture. In some aspects, WAN entity 138 may be alternatively referred to as a WLAN-assisted WAN SON entity 138. Moreover, WAN entity 138 may be configured to function according to one or more of a self-configuration function, self-optimization function, and self-healing functions, all of which enable WAN entity 138 to plan, configure, manage, optimize and heal in an automated and effective manner.

Referring to first management component 132, an aspect of which may include various components and/or subcomponents which may be configured to manage interference at a second RAT entity (e.g., WAN entity 138) based on measurement information received at a first RAT entity (e.g., WLAN entity 136). Specifically, in such aspects, first management component 132 may be configured to receive, at first RAT entity (e.g., WLAN entity 136) measurement information from UE 120y for assisting with interference management at second RAT entity (e.g., WAN entity 138). For example, UE 120y may be in an environment demonstrating high levels of pilot pollution, and thereby limiting UE 120y from obtaining accurate measurement information associated with second RAT entity.

In some aspects, SON component 130 and/or UE 120y via measurement component 140 may determine or identify that the environment demonstrates high levels of pilot pollution. As such, in aspects where the first RAT entity may be collocated with the second RAT entity, that is, where WLAN entity 136 may be collocated with WAN entity 138, the first RAT entity, or WLAN entity 136, may be configured to assist WAN entity 138 by receiving and processing measurement information from UE 120y. In such aspects, although WAN entity 138 may be capable or configured to obtain these measurements from UE 120y, the environment may preclude WAN entity 138 from receiving accurate results from UE 120y.

For example, the air interface corresponding to WAN entity 138 may not allow the embedding and transmission of RAT entity-specific information to UE 120y or another small cell (e.g., small cell 110z). Accordingly, WLAN entity 136, which may not be experiencing poor or diminished communication quality with or otherwise between UE 120y, may receive more accurate measurements results (e.g., measurement information) from UE 120y. Additionally, WAN entity 138 may be capable of or configured to determine when to use or process the measurement information received from WLAN entity 136. In such aspects, WLAN entity 136 may be configured to receive measurement information on a periodic basis.

In further aspects, first management component 132 may be configured to arrange or otherwise configure the second RAT entity (e.g., WAN entity 138) based at least in part on the measurement information received by the first RAT entity (e.g., WLAN entity 136). Specifically, the measurement information may include a pathloss value determined based at least in part on one or both of a signal strength value and a transmit power value of one or both of the first RAT entity and the second RAT entity. In some aspects, the signal strength value comprises a received signal strength indicator (RSSI) value. As such, WLAN entity 136 and/or UE 120y may be configured to determine a pathloss value of the second RAT entity (e.g., WAN entity 138) based at least in part on the pathloss value of the first RAT entity (e.g., WLAN entity 136) and a correction factor value. In such aspects, the correction factor value may be a function of at least a frequency and/or frequency band of the second RAT entity (e.g., WAN entity 138). Additionally, the correction factor may include a transmission power value and an antenna gain value of one or both of WLAN entity 136 and WAN entity 138.

In additional aspects, first management component 132 may be configured to transmit, using the first RAT entity (e.g., WLAN entity 136), a management indication to trigger UE 120y to determine the measurement information by performing one or more measurements on or at the first RAT entity. In other words, the WLAN radio of small cell 110y may be configured to transmit a management indication in the form of a beacon indication to trigger UE 120y to measure at least the signal strength (e.g., RSSI) of, or corresponding to, the beacon indication. In such aspects, the transmission of the beacon indication to UE 120y may be made periodically.

In such aspects, the beacon indication transmitted by the WLAN entity 136 may alternatively be referred to as a beacon frame, which may be a type of management frame, and transmitted periodically to enable WLAN entities and/or UEs to establish and maintain communications in an orderly fashion. For instance, a beacon frame may be a management frame in IEEE 802.11 based WLANs and may include information about the network. In some aspects, a beacon's frame body may reside between a header and a cyclic redundancy checking (CRC) field and constitutes the other half of the beacon frame.

Each beacon frame may carry or include information in the frame body including, but not limited to, a timestamp, a beacon interval, capability information, a service set identifier (SSID), supported rates, a frequency-hopping (FH) Parameter Set, a direct-Sequence (DS) Parameter Set, a contention-Free (CF) Parameter Set, an MSS Parameter Set, and a traffic indication map (TIM). For example, the beacon indication may include an SSID such as an SSID of another first RAT collocated with another second RAT.

Further, an aspect is described of second management component 134 which may include various components and/or subcomponents that may be configured to manage interference at a second RAT (e.g., WAN entity 138) based on measurement information received at a first RAT (e.g., WLAN entity 136). Specifically, in such aspect, second management component 134 may be configured to receive, at the first RAT (e.g., WLAN entity 136), a request indication from the UE 120y (e.g., probe request indication) for triggering transmission of a management indication (e.g., probe response indication). In some aspects, a management indication may take the form of, or be similar to a probe request, which may be used to actively seek any, or a particular access point or BSS, such as WLAN entity 136. Additionally, a management indication may be a reply with station parameters and supported data rates, and/or may include at least some information associated with the beacon indication described herein.

Further, second management component 134 may be configured to embed, by a first RAT (e.g., WLAN entity 136), RAT-specific information of a second RAT (e.g., WAN entity 138) in the management indication. In such aspects, the first RAT and the second RAT may be collocated entities. Additionally, second management component 134 may be configured to transmit the management indication to UE 120y. In such aspects, the management indication may allow UE 120y to obtain similar measurements as a transmitted management indication (e.g., beacon indication).

That is, a management indication may enable UE 120y to obtain at least a corresponding signal strength value for pathloss determination of one or both of first RAT and second RAT. In some aspects, management indication may include or take the form of a probe response signal/indication, a beacon indication, or any broadcast indication, each of which may be associated with WLAN entity 136. In other aspects, measurement information associated with the transmission of a broadcast indication may be received directly by second RAT entity (e.g., WAN entity 138) or via UE 120y.

In some aspects, the RAT entity-specific information of the second RAT may include one or more of a load level value, a number of serving UEs, quality of service information and carrier type information. In some aspects, the carrier type information may include information relating to a number of carriers at the small cell, an indication of whether carrier aggregation is supported at the small cell for one or both of WLAN entity 136 and WAN entity 138, an indication of whether WAN entity 138 supports or communicates according to an unlicensed spectrum technology, and the channels and/or bands utilized at the small cell in one or both of the licensed and unlicensed spectrums at WAN entity 138. In additional aspects, second management component 134 may be configured to embed the RAT-specific information in a reserve field of a probe response indication. Additionally, in other aspects, the RAT-entity specific information may include scheduling information for one or more of the serving UEs. In such aspects, the scheduling information may include time and/or frequency resources. Further, the RAT-entity specific information may include an indication of whether a UE is a cell edge or cell center UE.

Referring to measurement component 140, which may be included, implemented, or embodied within UE 120y, an aspect is described which may include various components and/or subcomponents which may be configured to assist in the management of interference at a second RAT (e.g., WAN entity 138) based on measurement information transmitted to a first RAT (e.g., WLAN entity 136). Specifically, in such aspects measurement component 140 may be configured to measure a signal strength value corresponding to a management indication received from a first RAT (e.g., WLAN entity 136) for assisting with interference management at a second RAT (e.g., WAN entity 138). Further, measurement component 140 may be configured to transmit measurement information to the first RAT for use in configuration of the second RAT.

For example, measurement component 140 may be configured to determine a pathloss value of the first RAT (e.g., WLAN entity 136) based at least in part on one or both of the signal strength value (e.g., RSSI) and a transmit power value of one or both of the first RAT and the second RAT. Additionally, upon obtaining and/or determining the pathloss associated with WLAN entity 136, measurement component 140 may be configured to determine a pathloss value of the second RAT (e.g., WAN entity 138) based at least in part on the pathloss value of the first RAT and a correction factor value. In some aspects, the correction factor value may be a function of at least a frequency of the second RAT.

In further aspects, the measurement information may include one or more of the pathloss value of the first RAT, the pathloss value of the second RAT, a load level value, a number of serving UEs, quality of service information and carrier type information. As such, UE 120y may be configured to provide measurement information in addition to a pathloss value according to a request or instruction from WLAN entity 136. Moreover, measurement component 140 may be configured to identify the first RAT entity (e.g., WLAN entity 136) collocated with the second RAT entity (e.g., WAN entity 138) based at least in part on one or both of an SSID or a basic serving set identifier (BSSID) obtained from the management indication. In certain instances, the SSID may be configured to maintain packet information within the correct WLAN, even when overlapping WLANs are present. However, there are usually multiple access points within each WLAN, and there has to be a way to identify those access points and their associated clients. Therefore a BSSID may be included in all wireless packet information.

In some aspects, measurement component 140 may be configured to send a request indication (e.g., probe request indication) to a first RAT (e.g., WLAN entity 136) for triggering transmission of the management indication. In such aspects, the management indication may comprise a probe response indication or a beacon indication. Additionally, in order to trigger probe responses from any and all desired collocated small cells, measurement component 140 may be configured to send the probe request indication comprising one or both of an SSID or a BSSID.

For example, measurement component 140 may be configured to determine that a request indication transmission condition has been met for triggering transmission of the request indication to WLAN entity 136. In other words, UE 120y, via measurement component 140, may determine that communication quality with a small cell (e.g., small cell 110y) with which it may be actively connected with has decreased. Specifically, measurement component 140 may be configured to determine that the request indication transmission condition has been met by one or more of determining that a channel quality indicator (CQI) value meets or falls below a CQI threshold value, a bit error rate (BER) value meets or exceeds a BER threshold value, and a CQI backoff value meets or exceeds a CQI backoff threshold value. Additionally, the request transmission condition may be determined based at least in part on radio link failure (RLF) information, outer rate loop control information, or some other mobility related information.

Moreover, for example, the telecommunications network system 100 (FIG. 1) may be an LTE network or some other similar wireless wide area network or WWAN. In such LTE aspects, the telecommunications network system 100 may include a number of eNodeBs 110, each of which may include SON component 130, user equipment (UEs) 120 including measurement component 140, and other network entities. An eNodeB 110 for a macro cell may be referred to as a macro eNodeB. An eNodeB 110 for a small cell may be referred to as a small eNodeB. In the example shown in FIG. 1, the eNodeBs 110a, 110b and 110c may be macro eNodeBs for the macro cells 102a, 102b and 102c, respectively. The eNodeB 110x, 110y and 110z may be a small eNodeB for a small cells 102x, 102y and 102z. An eNodeB 110 may provide communication coverage for one or more (e.g., three) cells.

It should be understood that each of the eNodeBs may include SON component 130. In some aspects, the telecommunications network system 100 (FIG. 1) may include one or more relay stations 110r and 120r, that may also be referred to as a relay eNodeB, a relay, etc. The relay station 110r may be a station that receives a transmission of data and/or other information from an upstream station (e.g., an eNodeB 110 or a UE 120) and sends the received transmission of the data and/or other information to a downstream station (e.g., a UE 120 or an eNodeB 110). The relay station 120r may be a UE that relays transmissions for other UEs (not shown). In the example shown in FIG. 1, the relay station 110r may communicate with the eNodeB 110a and the UE 120r in order to facilitate communication between the eNodeB 110a and the UE 120r.

The telecommunications network system 100 (FIG. 1) may be a heterogeneous network that includes eNodeBs 110 of different types, e.g., macro eNodeBs 110a-c, pico eNodeBs 110x, femto eNodeBs 110y-z, relays 110r, etc. These different types of eNodeBs 110 may have different transmit power levels, different coverage areas, and different impact on interference in the telecommunications network system 100. For example, macro eNodeBs 110a-c may have a high transmit power level (e.g., 20 Watts) whereas pico eNodeBs 110x, femto eNodeBs 110y-z and relays 110r may have a lower transmit power level (e.g., 1 Watt).

The telecommunications network system 100 may support synchronous or asynchronous operation. For synchronous operation, the eNodeBs 110 may have similar frame timing, and transmissions from different eNodeBs 110 and may be approximately aligned in time. For asynchronous operation, the eNodeBs 110 may have different frame timing, and transmissions from different eNodeBs 110 and may not be aligned in time. The techniques described herein may be used for both synchronous and asynchronous operation.

A network controller 124 may be coupled to a set of eNodeBs 110 and provide coordination and control for these eNodeBs 110. The network controller 124 may communicate with the eNodeBs 110 via a backhaul (not shown). The eNodeBs 110 may also communicate with one another, e.g., directly or indirectly via wireless or wire line backhaul (e.g., X2 interface) (not shown).

The UEs 120 (e.g., 120x, 120y, etc.) may be dispersed throughout the telecommunications network system 100, and each UE 120 may be stationary or mobile. For example, the UE 120 may be referred to as a terminal, a mobile station, a subscriber unit, a station, etc. In another example, the UE 120 may be a cellular phone, a personal digital assistant (PDA), a wireless modem, a wireless communication device, a handheld device, a laptop computer, a cordless phone, a wireless local loop (WLL) station, a tablet, a netbook, a smart book, etc. The UE 120 may be able to communicate with macro eNodeBs 110a-c, pico eNodeBs 110x, femto eNodeBs 110y-z, relays 110r, etc. For example, in FIG. 1, a solid line with double arrows may indicate desired transmissions between a UE 120 and a serving eNodeB 110, which is an eNodeB 110 designated to serve the UE 120 on the downlink and/or uplink. A dashed line with double arrows may indicate interfering transmissions between a UE 120 and an eNodeB 110.

LTE may utilize orthogonal frequency division multiplexing (OFDM) on the downlink and single-carrier frequency division multiplexing (SC-FDM) on the uplink. OFDM and SC-FDM may partition the system bandwidth into multiple (K) orthogonal subcarriers, which are also commonly referred to as tones, bins, etc. Each subcarrier may be modulated with data. In general, modulation symbols may be sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal Fast Fourier Transform (FFT) size may be equal to 128, 256, 512, 1024 or 2048 for system bandwidth of 1.25, 2.5, 5, 10 or 20 megahertz (MHz), respectively. The system bandwidth may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2A:
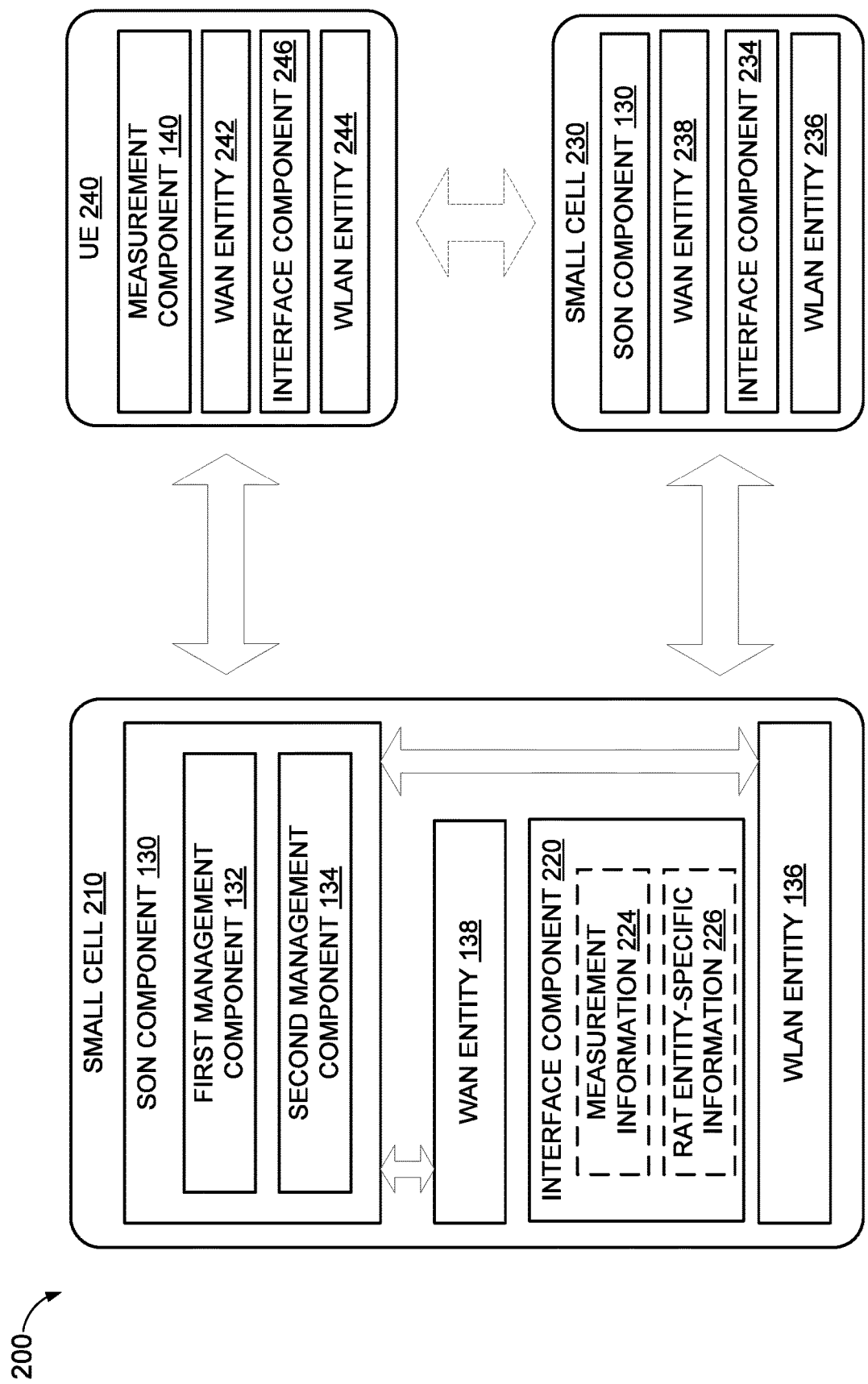
FIGS. 2A and 2B are block diagrams conceptually illustrating communication environments in accordance with the aspects of the present disclosure, e.g., according to FIG. 1.

Referring to FIG. 2A, an aspect is illustrated of a communication environment 200 including one or more small cells in communication with one or more UEs for assisting a particular RAT entity of the one or more small cells with a SON configuration. Specifically, communication environment 200 may include first small cell 210, second small cell 230 and UE 240. It should be understood that small cells 210 and 230 may be the same as or similar to small cell 110y of FIG. 1, aspects of which are described herein. Additionally, in some aspects, UE 240 may be the same as or similar to UE 120y of FIG. 1, aspects of which are described herein.

In an aspect, first small cell 210 may receive measurement information from one or both of second small cell 230 and UE 240. Additionally, first small cell may transmit a request indication (e.g., in the form of a probe request) to one or both of second small cell 230 and UE 240. In particular, first small cell 210 may include interface component 220, which may facilitate communication between WLAN entity 136 and WAN entity 138. That is, interface component 220 may include one or more wired and/or wireless links between WLAN entity 136 and WAN entity 138 configured to enable communication of data such as, but not limited to, measurement information 224 and RAT entity-specific information 226. Additionally, UE 240 may include WAN entity 242 and WLAN entity 244 configured to communicate with respective entities of one or more small cells, and including an interface component 246 facilitating communication between WAN entity 242 and WLAN entity 244.

In an operational aspect, first small cell 210 may receive measurement information 224 from UE 240, for example, in response to a transmission of a probe request indication by WLAN entity 136 of first small cell 210 to WLAN entity 244 of UE 240 to trigger UE 240 to perform or otherwise obtain one or more measurements (e.g., RSSI) based on the probe request indication. In other aspects, UE 240 may detect or otherwise determine that a communication quality of the communication environment 200 may have degraded and thus may trigger transmission of a probe request indication to first small cell 210 for triggering transmission of a response indication.

In such aspects, first small cell 210 may embed RAT entity-specific information 226 (e.g., related to WAN entity 138) within the response indication for transmission to UE 240. Upon receiving measurement information 224 from UE 240 and/or second small cell 230, first small cell may be configured to transmit the measurement information to the WAN entity 138 via interface component 220. Likewise, WAN entity 138 may transmit RAT entity-specific information 226 that may be embedded in a probe indication or response indication to WLAN entity 136 for transmission to UE 240.

Moreover, UE 240 may detect a MAC identifier of a WLAN entity (e.g., WLAN entity 236) along with, or in addition to the measurement information 224 (e.g., RSSI). UE 240 may transmit the measurement information 224 along with the MAC identifier of the WLAN entity to first small cell 210. First small cell 210 may calculate the pathloss between UE 240 and WAN entity 238 of second small cell 230. The pathloss calculation may be calibrated or otherwise modified to take into account a band difference, a transmit power difference, and an antenna gain difference. Additionally, the pathloss between UE 240 and second small cell 230 may be fed back, along with the MAC identifier of WLAN entity 236, to the first small cell 210. The pathloss calibration may be performed at UE 240, or the UE can transmit measurement information 224 (e.g., RSSI) along with the WLAN entity 236 MAC ID, and a frequency band at which the measurements were performed to the WAN entity 238 such that it may perform the calibration.

In further aspects, first small cell 210 and second small cell 230 may listen, either continuously or periodically, to the beacon transmissions of each respective WLAN entity 136. For example, WLAN entity 136 of first small cell 210 may receive or otherwise determine measurement information 224 (e.g., RSSI) based on receiving a beacon transmission of WLAN entity 236 of second small cell 230. The measurement information 224 may be transmitted to WAN entity 138 via interface component 220.

Further, WLAN entity 136 and/or WLAN entity 244 may be configured to establish one or both of a connection to a WLAN network and a connection to a Wi-Fi network. In other aspects, WLAN entity 136 may be configured to establish a connection to an unlicensed spectrum network. In such aspects, the measurement information transmitted and/or received according to first management component 132, second management component, and measurement component 140 may be embedded in one of an unlicensed broadcast indication (e.g., system information block) and/or one or more multi-broadcast single-frequency network frames/indications. Additionally, the second RAT entity is configured to establish one or both of a connection with a WAN and a connection with one or more of a LTE network, a UMTS network, and a CDMA network.

In aspects related to the first management component 132 and the second management component 134, small cell 210 may be configured to include a first RAT identifier associated with, or otherwise used to identify the WLAN entity 136 and a second RAT identifier associated with, or otherwise used to identify the WAN entity 138. In some aspects, the first RAT identifier may be a cell identifier such as a medium access control (MAC) identifier. In other aspects, the second RAT identifier may a cell identifier such as a physical cell identifier (PCI). For example, to identify or determine the origin of the received information (e.g., measurement information 224), small cell 210 having collocated WLAN entity 136 and WAN entity 138 may receive measurement information 224 including identifying information (e.g., cell ID information).

That is, in aspects where first small cell 210 may receive measurement information 224 from second small cell, either directly or indirectly via UE 240, first small cell 210 may decode or determine the identification information to determine the origin of the measurement information 224. Hence, each small cell in the communication environment 200 may map, or include mapped, in a one-to-one relationship, first RAT identifier (e.g., MAC ID) and second RAT identifier (e.g., PCI) for accurate identification purposes at the neighboring small cell. Likewise, UE 240 may send identification information related to or associated with the measurement information 224 obtained from WLAN entity 236 of second small cell 230 to WLAN entity 136 of first small cell 210, or vice versa.

Figure 2B:
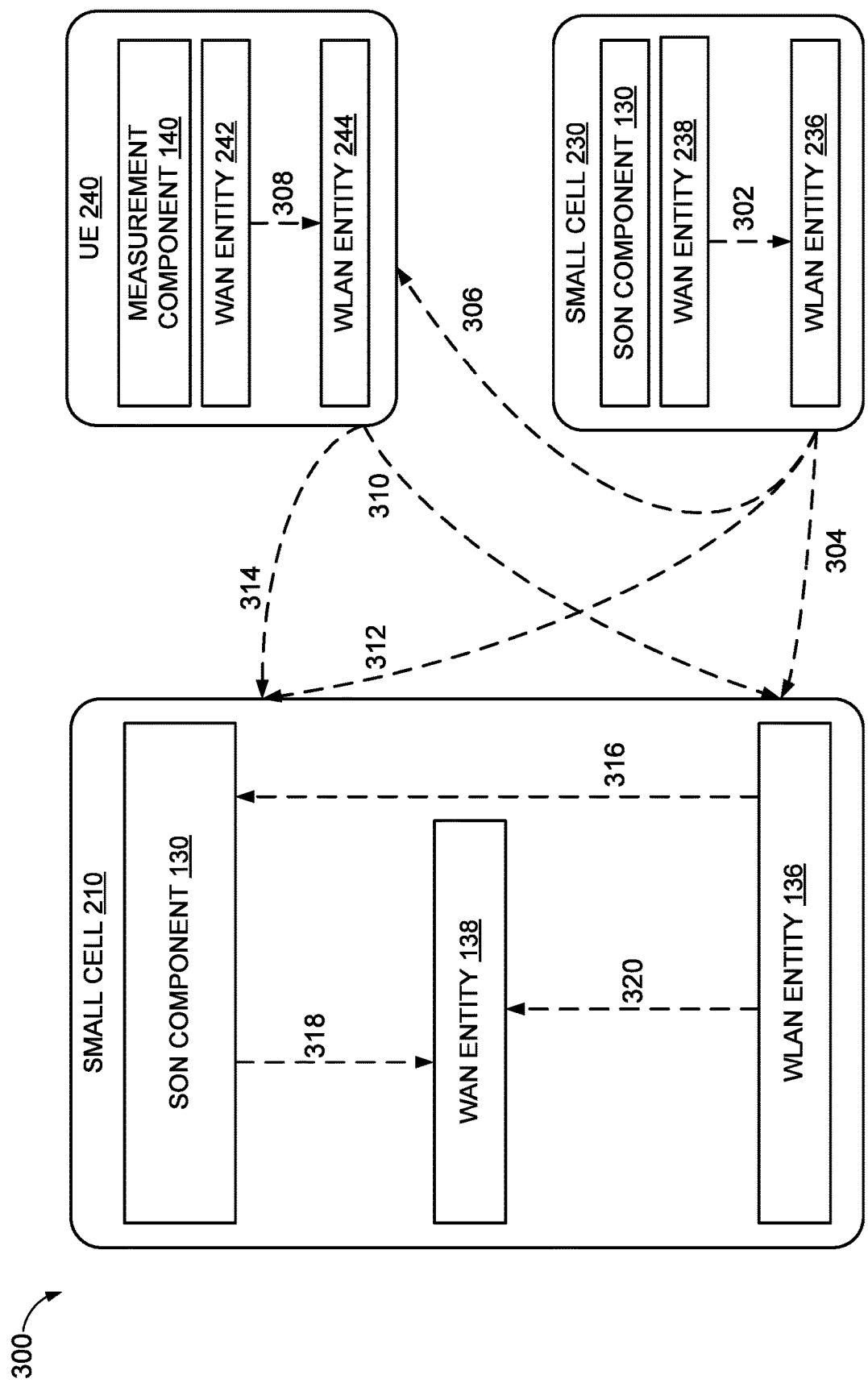

Referring to FIG. 2B, an aspect is illustrated of a communication environment 300 including one or more small cells in communication with one or more UEs for assisting a particular RAT entity of the one or more small cells with a SON configuration. Specifically, communication environment 300 may include first small cell 210, second small cell 230 and UE 240. It should be understood that small cells 210 and 230 may be the same as or similar to small cell 110y of FIG. 1, aspects of which are described herein. Additionally, in some aspects, UE 240 may be the same as or similar to UE 120y of FIG. 1, aspects of which are described herein.

In an aspect, small cell 230 may embed RAT entity-specific information (e.g., related to WAN entity 238) within a message indication for transmission by WLAN entity 236, as illustrated by line 302. In response, in an example of one case, WLAN entity 236 may transmit the message indication including the RAT entity-specific information of WAN entity 238 to small cell 210 and WLAN entity 136, as illustrated by line 304. In an example of another case, WLAN entity 236 may transmit the message indication including the RAT entity-specific information of WAN entity 238 to UE 240 and WLAN entity 244, as illustrated by line 306, which in turn may transmit the RAT entity-specific information of WAN entity 238 to small cell 210 and WLAN entity 136, as illustrated by line 310. In yet another case, for example, as illustrated by line 312, WLAN entity 236 may transmit the message indication including the RAT entity-specific information of WAN entity 238 to small cell 210 and SON component 130. In such aspects, the message indication may comprise a probe response indication or a beacon indication including one or more RAT entity-specific information. In further aspects, first small cell 210, UE 240 and second small cell 230 may listen, either continuously or periodically, to the beacon transmissions of each respective WLAN entity. For example, WLAN entity 136 of first small cell 210 may receive or otherwise determine RAT entity-specific information of WAN entity 238 based on receiving a beacon transmission of WLAN entity 236 of second small cell 230. This aspect may also operate with other aspects described herein.

In the aspect where the RAT entity-specific information of WAN entity 238 is transmitted to UE 240 and WLAN entity 244, as illustrated by line 306, UE 240 and/or WLAN entity 244 may attempt to decode the embedded RAT entity-specific information of WAN entity 238. Once decoded, the RAT entity-specific information of WAN entity 238 may be transmitted to WLAN entity 136, as illustrated by line 310, and/or transmitted to SON component 130 of small cell 210, as illustrated by line 314.

In another aspect, as illustrated by line 308, UE 240 may embed RAT entity-specific information (e.g., related to WAN entity 242) within another message indication for transmission by WLAN entity 244. As such, in one case, for example, WLAN entity 244 may transmit the message indication including the RAT entity-specific information of WAN entity 242 to small cell 210 and WLAN entity 136, as illustrated by line 310. In another case, for example, WLAN entity 244 may transmit the message indication including the RAT entity-specific information of WAN entity 242 to small cell 210 and SON component 130, as illustrated by line 314. In yet another case, for example, WLAN entity 244 may transmit the message indication including both the RAT entity-specific information of WAN entity 242 and the RAT entity-specific information of WAN entity 238 to small cell 210 and WLAN entity 136/SON component 130, as illustrated by lines 310 and 314, respectively. These aspects may also operate with other aspects described herein.

In one aspect of the communication illustrated by line 320, where the RAT entity-specific information of WAN entity 238 is transmitted to small cell 210 and WLAN entity 136 from WLAN entity 236, as illustrated by line 304, and/or transmitted from WLAN entity 244, as illustrated by line 310, WLAN entity 136 may decode the embedded RAT entity-specific information of WAN entity 238, and transmit the RAT entity-specific information of WAN entity 238 to WAN entity 138. Further, in another aspect of the communication illustrated by line 320, where the message indication received by WLAN entity 136 includes the RAT entity-specific information of WAN entity 242, WLAN entity 136 may decode the embedded RAT entity-specific information of WAN entity 242, and transmit the RAT entity-specific information of WAN entity 242 to WAN entity 138. These aspects may also operate with other aspects described herein.

In one aspect of the communication illustrated by line 318, where WLAN entity 136 may transmit the embedded RAT entity-specific information of WAN entity 238 to SON component 130, as illustrated by line 316, and/or where WLAN entity 244 may transmit RAT entity-specific information of WAN entity 238 to SON component 130, as illustrated by line 314, SON component 130 may decode the embedded RAT entity-specific information of WAN entity 238, and transmit the RAT entity-specific information of WAN entity 238 to WAN entity 138. Further, in another aspect of the communication illustrated by line 318, where the message indication received by SON component 130 includes the RAT entity-specific information of WAN entity 242, SON component 130 may decode the embedded RAT entity-specific information of WAN entity 242, and transmit the RAT entity-specific information of WAN entity 242 to WAN entity 138. These aspects may also operate with other aspects described herein.

Referring to FIGS. 3-6, the methods are shown and described as a series of acts for purposes of simplicity of explanation. However, it is to be understood and appreciated that the methods (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram.

Moreover, not all illustrated acts may be required to implement a method in accordance with one or more features described herein.

Figure 3:
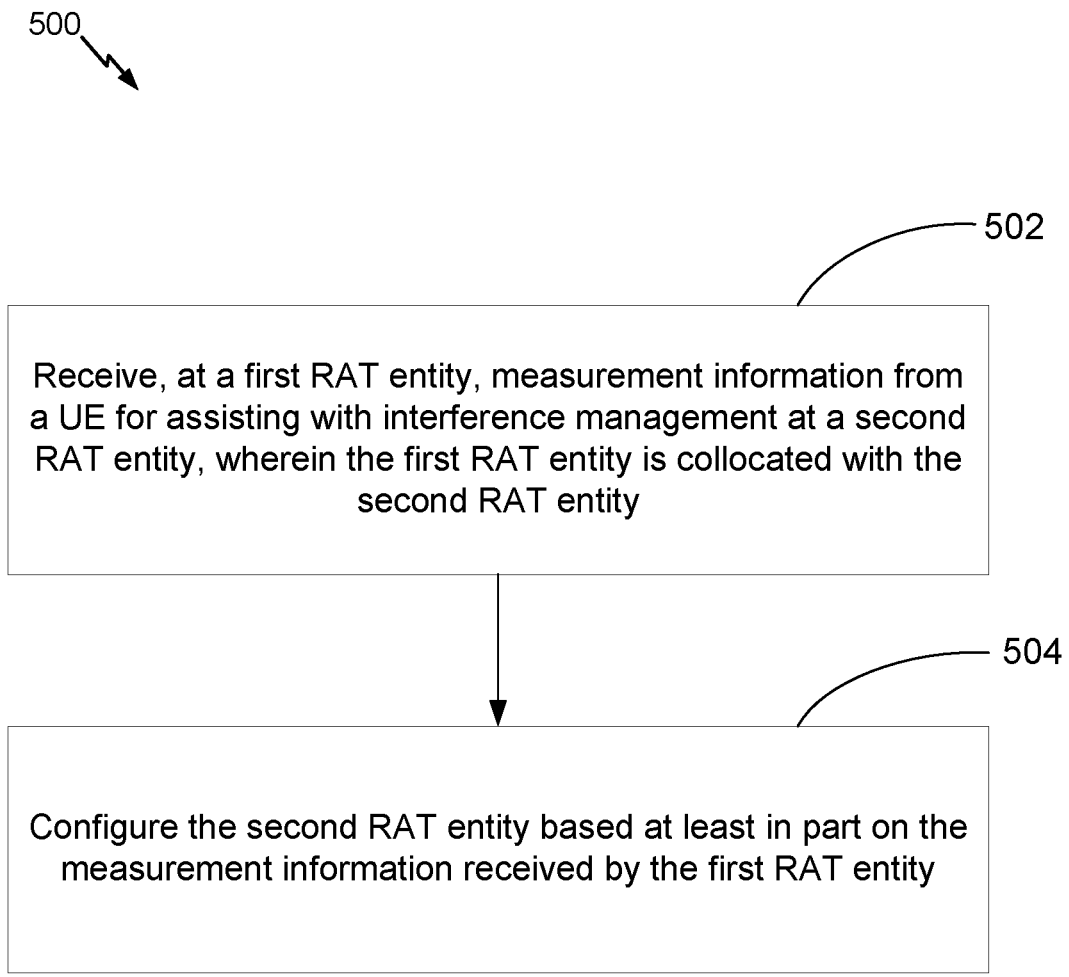
FIG. 3 is a flow diagram illustrating an aspect of a method of communication, e.g., according to the first management component of FIG. 1.

Referring to FIG. 3, in an operational aspect, a network entity such as small cell 110y (FIG. 1) may perform one aspect of a method 500 for managing interference at a second RAT entity (e.g., WAN) based on measurement information received at a first RAT entity (e.g., WLAN) according to the aspects of the first management component 132 (FIG. 1).

In an aspect, at block 502, method 500 may receive, at a first RAT entity, measurement information from a UE for assisting with interference management at a second RAT entity. For example, as described herein, SON component 130 (FIG. 1) may execute first management component 132 (FIG. 1) to receive, at a first RAT entity (e.g., WLAN entity 136, FIG. 1), measurement information from a UE 120y (FIG. 1) for assisting with interference management at a second RAT entity (e.g., WAN entity 138, FIG. 1). In some aspects, the first RAT entity may be collocated with the second RAT entity. Specifically, the measurement information may include a pathloss value determined based at least in part on one or both of a signal strength value and a transmit power value of one or both of the first RAT entity and the second RAT entity. In some aspects, the signal strength value comprises a received signal strength indicator (RSSI) value. As such, WLAN entity 136 and/or UE 120y may be configured to determine a pathloss value of the second RAT entity (e.g., WAN entity 138) based at least in part on the pathloss value of the first RAT entity (e.g., WLAN entity 136) and a correction factor value. In such aspects, the correction factor value may be a function of at least a frequency and/or frequency band of the second RAT entity (e.g., WAN entity 138). Additionally, the correction factor may include a transmission power value and an antenna gain value of one or both of WLAN entity 136 and WAN entity 138. In another aspect, first small cell 210 (FIG. 2A) may receive measurement information 224 from UE 240 (FIG. 2A), for example, in response to a transmission of a probe request indication by WLAN entity 136 of first small cell 210 to WLAN entity 244 of UE 240 to trigger UE 240 to perform or otherwise obtain one or more measurements (e.g., RSSI) based on the probe request indication. In a further example, UE 240 is may measure pathloss to small cell 230 based on measuring RSSI of a beacon indication or probe response of WLAN entity 236. Then, UE 240 may transmit the pathloss back to small cell 210, which may infer the pathloss between UE 240 and WAN entity 238 using the correction factor. The pathloss may then be used for SON and interference management such as power and resource management, along with mobility management.

Further, at block 504, method 500 may configure the second RAT entity based at least in part on the measurement information received by the first RAT entity. For example, as described herein, SON component 130 (FIG. 1) may execute first management component 132 (FIG. 1) to configure the second RAT entity (e.g., WAN entity 138, FIG. 1) based at least in part on the measurement information (e.g., pathloss) received by the first RAT entity (e.g., WLAN entity 136, FIG. 1). In another aspect, upon receiving measurement information 224 (FIG. 2A) from UE 240 (FIG. 2A) and/or second small cell 230, first small cell 210 may be configured to transmit the measurement information to the WAN entity 138 via interface component 220.

Figure 4:
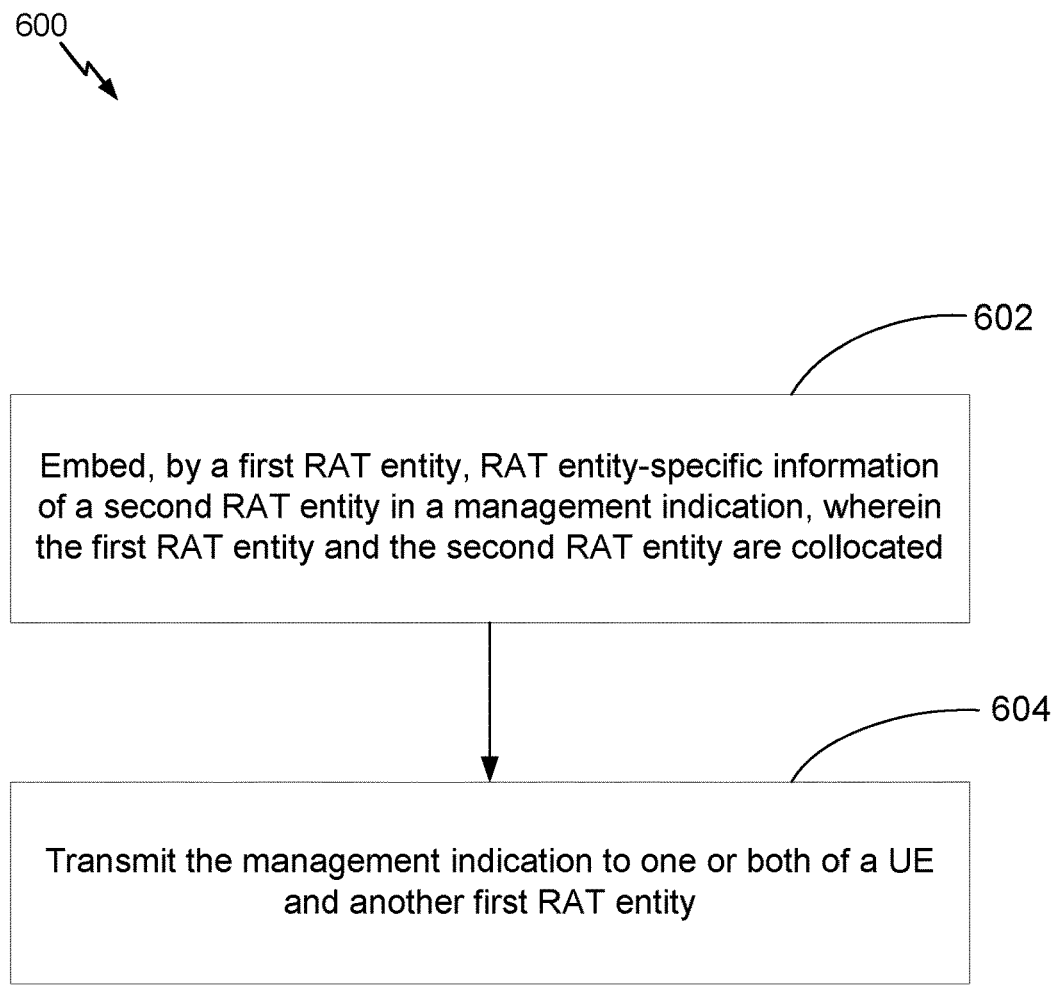
FIG. 4 is a flow diagram illustrating an aspect of a method of communication, e.g., according to the second management component of FIG. 1.

Referring to FIG. 4, in an operational aspect, a network entity such as small cell 110y (FIG. 1) may perform one aspect of a method 600 for managing interference at a second RAT entity (e.g., WAN) based on measurement information received at a first RAT entity (e.g., WLAN) according to the aspects of the second management component 134 (FIG. 1).

In an aspect, at block 602, method 600 may embed, by a first RAT entity, RAT entity-specific information of a second RAT entity in a management indication, wherein the first RAT entity and the second RAT entity are collocated. For example, as described herein, SON component 130 (FIG. 1) may execute second management component 134 (FIG. 1) to embed, by a first RAT entity (e.g., WLAN entity 136, FIG. 1), RAT entity-specific information of a second RAT entity (e.g., WAN entity 138, FIG. 1) in a management indication. In some aspects, the first RAT entity (e.g., WLAN entity 136, FIG. 1) and the second RAT entity (e.g., WAN entity 138, FIG. 1) may be collocated. In certain instances, the WLAN entity 136 of small cell 110y may be configured to transmit a management indication in the form of a beacon indication to trigger UE 120y to measure at least the signal strength (e.g., RSSI) of, or corresponding to, the beacon indication. In such aspects, the transmission of the beacon indication to UE 120y may be made periodically. In such aspects, the beacon indication transmitted by the WLAN entity 136 may alternatively be referred to as a beacon frame, which may be a type of management frame, and transmitted periodically to enable WLAN entities and/or UEs to establish and maintain communications in an orderly fashion. For instance, a beacon frame may be a management frame in IEEE 802.11-based WLANs and may include information about the network. In some aspects, a body of the beacon frame may reside between a header and a CRC field and constitutes the other half of the beacon frame. Each beacon frame may carry or include information in the frame body including, but not limited to, a timestamp, a beacon interval, capability information, a SSID, supported rates, a FH Parameter Set, a DS Parameter Set, a CF Parameter Set, an MSS Parameter Set, and a TIM. For example, the beacon indication may include an SSID such as an SSID of another first RAT collocated with another second RAT. In another aspect, first small cell 210 (FIG. 2A) may embed RAT entity-specific information 226 (e.g., related to WAN entity 138) within the response indication for transmission to UE 240.

Further, at block 604, method 600 may transmit the management indication to a UE. For instance, as described herein, SON component 130 (FIG. 1) may execute second management component 134 (FIG. 1) to transmit the management indication to a UE (e.g., UE 120, FIG. 1). In another aspect, the WLAN entity 136 (FIG. 2A) may receive a request indication from one or both of the UE 240 (FIG. 2A) and the WLAN entity 236 for triggering transmission of the management indication. For example, WAN entity 138 may transmit RAT entity-specific information 226 that may be embedded in a probe indication or response indication to WLAN entity 136 for transmission to UE 240.

Figure 5:
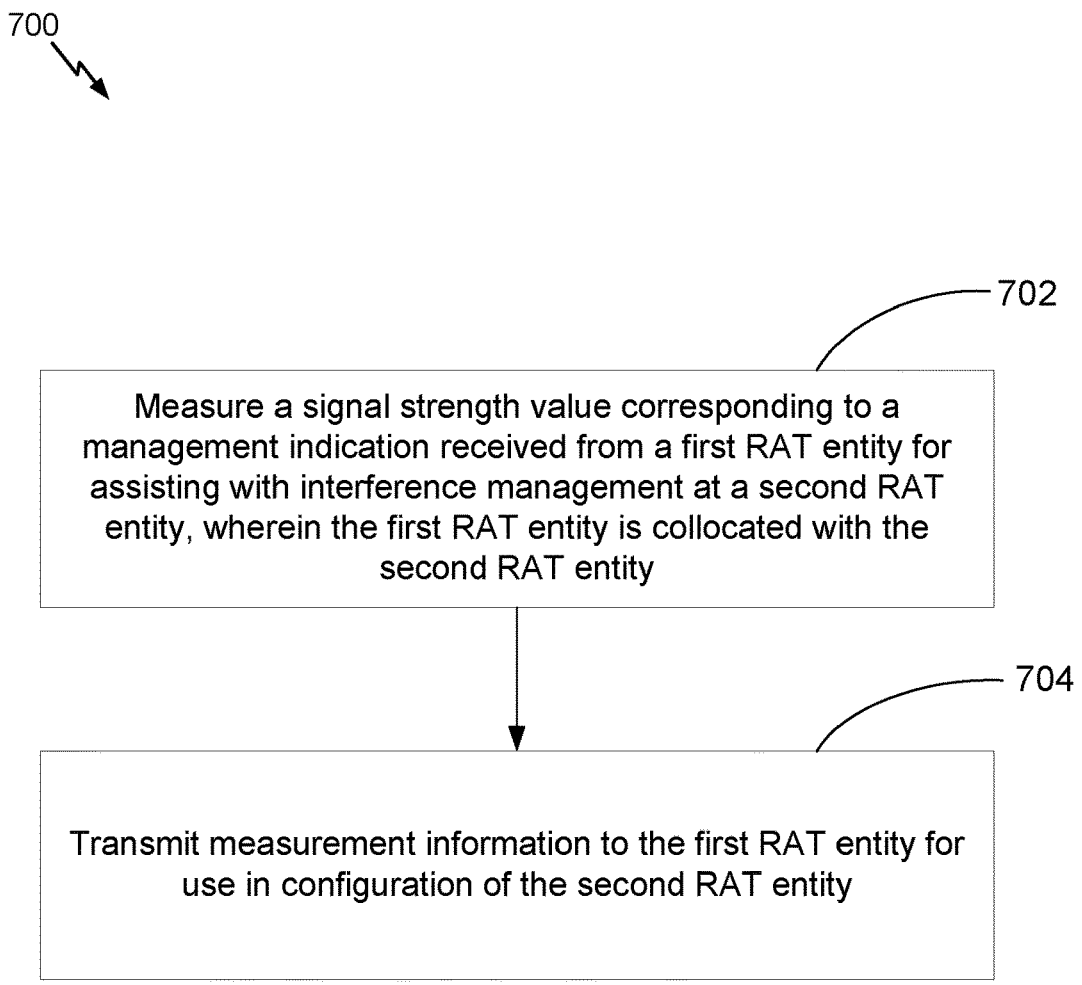
FIG. 5 is a flow diagram illustrating an aspect of a method of communication, e.g., according to the measurement component of FIG. 1.

Referring to FIG. 5, in an operational aspect, a network entity such as small cell 110y (FIG. 1) may perform one aspect of a method 700 for transmitting measurement information from a UE to a small cell for managing interference at a second RAT entity (e.g., WAN entity 138, FIG. 1) of the small cell based on measurement information received at a collocated first RAT entity (e.g., WLAN entity 136, FIG. 1) according to the aspects of the measurement component 140 (FIG. 1).

In an aspect, at block 702, method 700 may measure a signal strength value corresponding to a management indication received from a first RAT entity for assisting with interference management at a second RAT entity. For instance, as described herein, UE 120y (FIG. 1) may execute measurement component 140 (FIG. 1) to measure a signal strength value (e.g., RSSI) corresponding to a management indication (e.g., beacon indication) received from a first RAT entity (e.g., WLAN entity 136, FIG. 1) for assisting with interference management at a second RAT entity (e.g., WAN entity 138, FIG. 1). In some aspects, the first RAT entity may be collocated with the second RAT entity. For example, measurement component 140 may be configured to determine a pathloss value of the first RAT (e.g., WLAN entity 136) based at least in part on one or both of the signal strength value (e.g., RSSI) and a generate power value of one or both of the first RAT and the second RAT. Additionally, upon obtaining and/or determining the pathloss associated with WLAN entity 136, measurement component 140 may be configured to determine a pathloss value of the second RAT (e.g., WAN entity 138) based at least in part on the pathloss value of the first RAT and a correction factor value. In some aspects, the correction factor value may be a function of at least a frequency of the second RAT. In another aspect, UE 240 (FIG. 2A) may execute WLAN entity 244 to receive a probe request indication from WLAN entity 136 of first small cell 210. As a result, UE 240 may execute measurement component 140 to obtain one or more measurements (e.g., RSSI) based on the probe request indication. Moreover, UE 240 may detect a MAC identifier of a WLAN entity (e.g., WLAN entity 236) along with, or in addition to, the measurement information 224 (e.g., RSSI).

Further, at block 704, method 700 may transmit measurement information to the first RAT entity for use in configuration of the second RAT entity. For example, as described herein, UE 120y (FIG. 1) may execute measurement component 140 (FIG. 1) to transmit measurement information (e.g., pathloss value) to the first RAT entity (e.g., WLAN entity 136, FIG. 1) for use in configuration of the second RAT entity (e.g., WAN entity 138, FIG. 1). In another aspect, UE 240 (FIG. 2A) may execute WLAN entity 244 (FIG. 2A) to transmit measurement information (e.g., pathloss value) to the corresponding WLAN entity 136 of the first small cell 210 for us in the configuration of the WAN entity 138. UE 240 may transmit the measurement information 224 along with the MAC identifier of the WLAN entity to first small cell 210. First small cell 210 may calculate the pathloss between UE 240 and WAN entity 238 of second small cell 230. The pathloss calculation may be calibrated or otherwise modified to take into account a band difference, a transmit power difference, and an antenna gain difference. Additionally, the pathloss between UE 240 and second small cell 230 may be fed back, along with the MAC identifier of WLAN entity 236, to the first small cell 210. The pathloss calibration may be performed at UE 240, or the UE can transmit measurement information 224 (e.g., RSSI) along with the WLAN entity 236 MAC ID, and a frequency band at which the measurements were performed to the WAN entity 238 such that it may perform the calibration.

Figure 6:
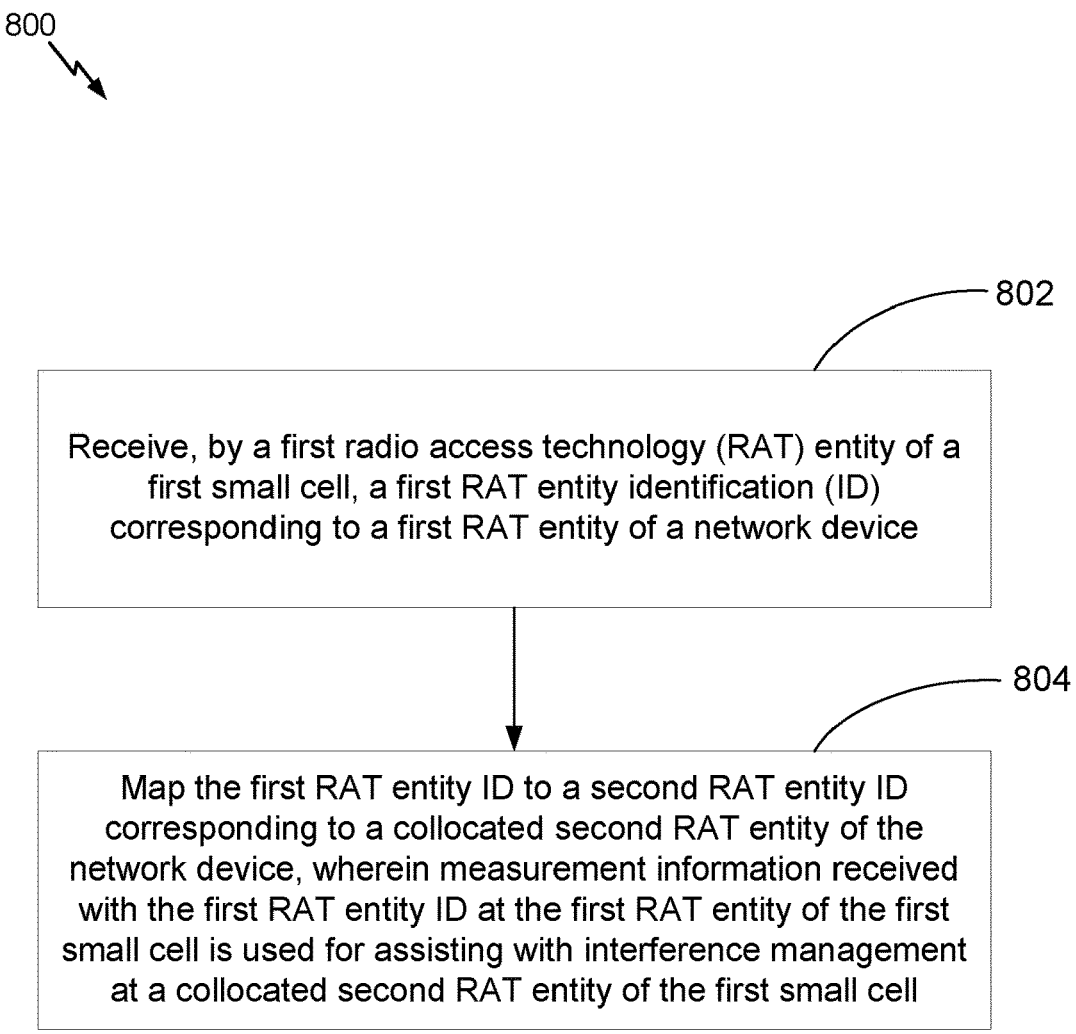
FIG. 6 is a flow diagram illustrating an aspect of a method of communication, e.g., according to the first management component of FIG. 1.

Referring to FIG. 6, in an operational aspect, a network entity such as small cell 110y (FIG. 1) may perform one aspect of a method 800 for managing interference at a second RAT entity (e.g., WAN) based on measurement information received at a first RAT entity (e.g., WLAN) according to the aspects of the first management component 132 (FIG. 1).

In an aspect, at block 802, method 800 may receive, by a first radio access technology (RAT) entity of a first small cell, a first RAT entity identification (ID) corresponding to a first RAT entity of a network device. For example, as described herein, SON component 130 (FIG. 1) may execute first management component 132 (FIG. 1) to receive, at a first RAT entity (e.g., WLAN entity 136, FIG. 1), a first RAT entity ID corresponding to a first RAT entity of a network device. In some instances, the first RAT entity ID may correspond to WLAN entity 244 (FIG. 2A) of UE 240. In other instances, the first RAT entity ID may correspond to WLAN entity 236 (FIG. 2A) of small cell 230.

In another aspect, at block 804, method 800 may map the first RAT entity ID to a second RAT entity ID corresponding to a collocated second RAT entity of the network device, wherein measurement information received with the first RAT entity ID at the first RAT entity of the first small cell is used for assisting with interference management at a collocated second RAT entity of the first small cell. For example, as described herein, SON component 130 (FIG. 1) may execute first management component 132 (FIG. 1) to map the first RAT entity ID to a second RAT entity ID corresponding to a collocated second RAT entity of the network device, wherein measurement information 224 (FIG. 2A) received with the first RAT entity ID at the first RAT entity (e.g., WLAN 136) of the first small cell 210 is used for assisting with interference management at a collocated second RAT entity (e.g., WAN entity 138) of the first small cell 210. In some instances, the measurement information 224 may include the first RAT entity ID, and the measurement information 224 may be received from one or both of a UE (e.g., UE 240) and a second small cell (e.g., second small cell 230). In other instances, the first RAT entity ID may be mapped to the second RAT entity ID by one or both of the UE 240 and second small cell 230 prior to transmission of the first RAT entity ID to the first small cell 210. In these instances, UE 240 and/or second small cell 230 may know the mapping configuration of the collocated RAT entities of other devices. As such, two or more RAT entity IDs corresponding to respective two or more collocated RAT entities are mapped in a one-to-one configuration. Further, the first RAT entity ID corresponds to a Wireless Local Access Network (WLAN) Media Access Control (MAC) ID, and the second RAT entity ID corresponds to one or more of a E-UTAN Cell Global Identifier (ECGI), Physical Cell Identifier (PCI), and a Long Term Evolution (LTE) Media Access Control (MAC) ID.

Figure 7:
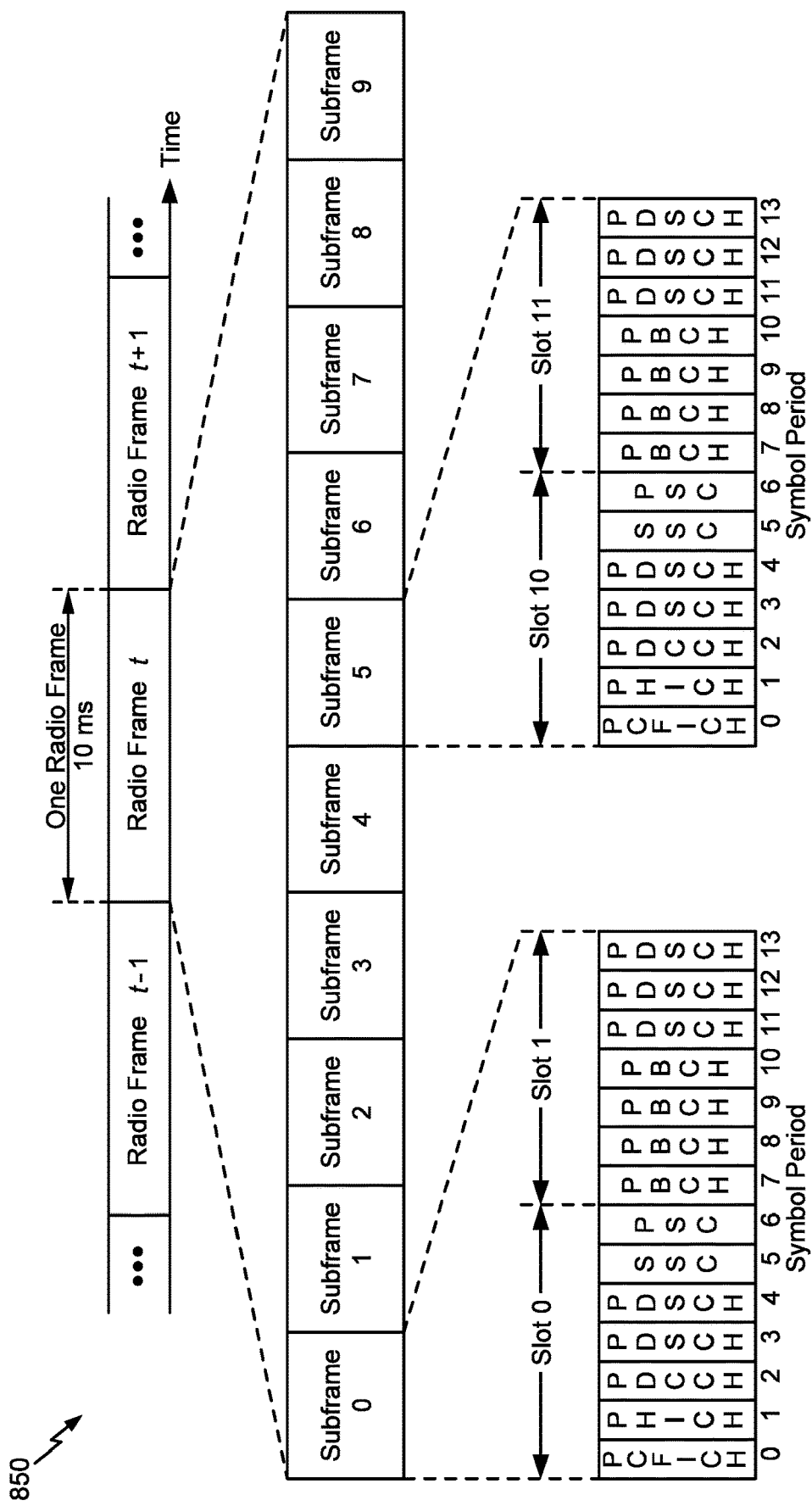
FIG. 7 is a block diagram conceptually illustrating an example of a downlink frame structure in a telecommunications system in accordance with an aspect of the present disclosure, e.g., according to FIG. 1.

FIG. 7 is a block diagram 850 conceptually illustrating an example of a down link frame structure in a telecommunications system in accordance with an aspect of the present disclosure. The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 7) or 14 symbol periods for an extended cyclic prefix (not shown). The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE for example, an eNodeB may send a primary synchronization signal (PSS) and a secondary synchronization signal (SSS) for each cell in the coverage area of the eNodeB. The primary synchronization signal (PSS) and secondary synchronization signal (SSS) may be sent in symbol periods 6 and 5, respectively, in each of sub-frames 0 and 5 of each radio frame with the normal cyclic prefix, as shown in FIG. 6. The synchronization signals may be used by UEs for cell detection and acquisition. The eNodeB may send system information in a Physical Broadcast Channel (PBCH) in symbol periods 0 to 3 of slot 1 of sub-frame 0.

The eNodeB may send information in a Physical Control Format Indicator Channel (PCFICH) in only a portion of the first symbol period of each sub-frame, although depicted in the entire first symbol period in FIG. 6. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 6, M=3. The eNodeB may send information in a Physical HARQ Indicator Channel (PHICH) and a Physical Downlink Control Channel (PDCCH) in the first M symbol periods of each sub-frame (M=3). The PHICH may carry information to support hybrid automatic retransmission (HARQ). The PDCCH may carry information on uplink and downlink resource allocation for UEs and power control information for uplink channels. Although not shown in the first symbol period in FIG. 6, it may be understood that the PDCCH and PHICH are also included in the first symbol period.

Figure 8:
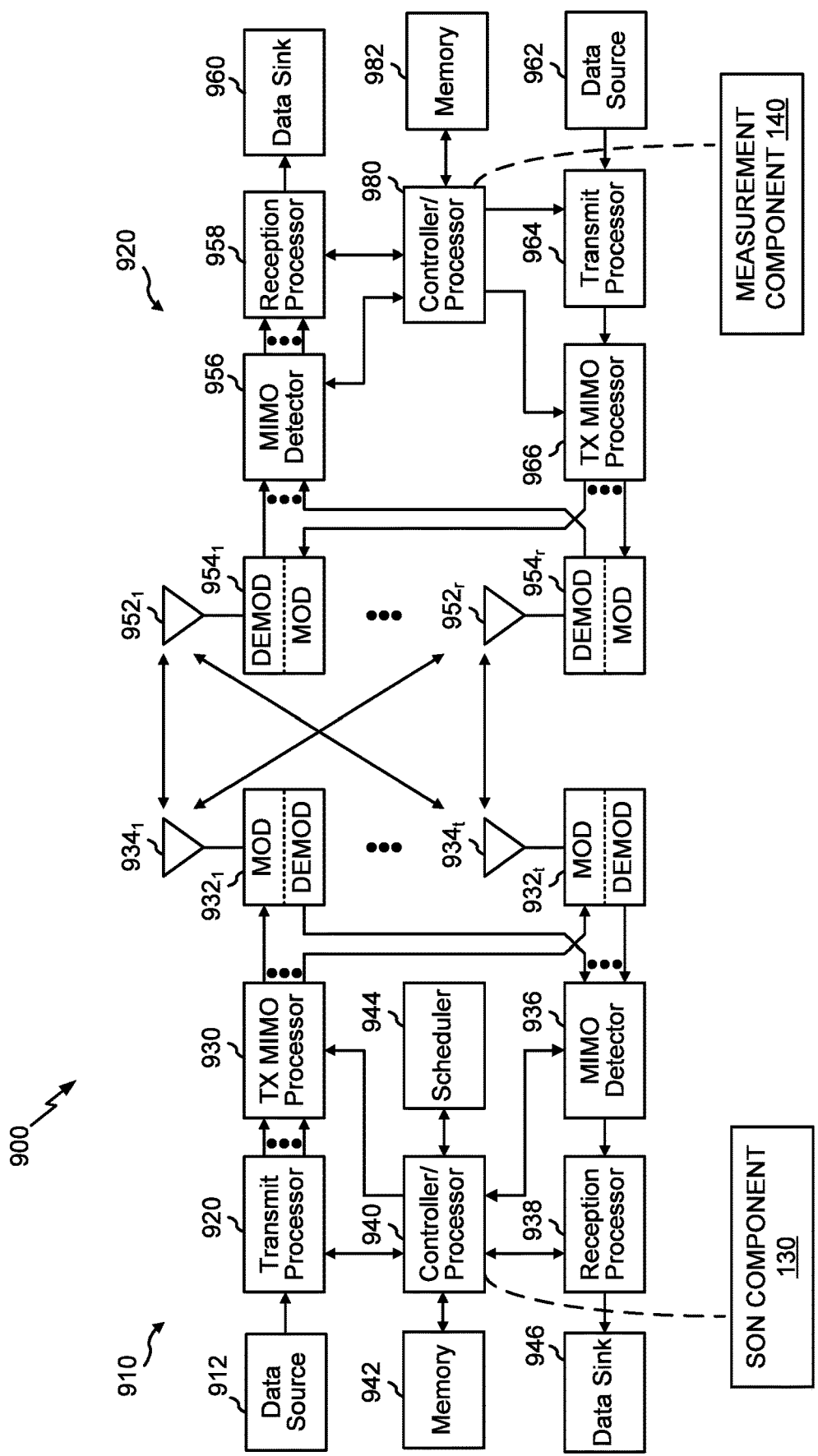
FIG. 8 is a block diagram conceptually illustrating an example of an eNodeB and an example of a UE configured in accordance with an aspect of the present disclosure, e.g., according to FIG. 1.

Similarly, the PHICH and PDCCH are also both in the second and third symbol periods, although not shown that way in FIG. 8. The eNodeB may send information in a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH around the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs in the coverage area. The eNodeB may send the PDCCH in a unicast manner to specific UEs in the coverage area. The eNodeB may also send the PDSCH in a unicast manner to specific UEs in the coverage area.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage areas of multiple eNodeBs. One of these eNodeBs may be selected to serve the UE. The serving eNodeB may be selected based on various criteria such as received power, path loss, signal-to-noise ratio (SNR), etc.

FIG. 8 is a block diagram conceptually illustrating an exemplary eNodeB 910 and an exemplary UE 920 configured in accordance with an aspect of the present disclosure. For example, the base station/eNodeB 910 and the UE 920, as shown in FIG. 8, may be one of the base stations/eNodeBs including SON component 130 and any one of the UEs 120 in FIG. 1 including measurement component 140. The base station 910 may be equipped with antennas $934_{1-t}$, and the UE 920 may be equipped with antennas $952_{1-r}$, wherein t and r are integers greater than or equal to one.

At the base station 910, a base station transmit processor 920 may receive data from a base station data source 912 and control information from a base station controller/processor 940. The control information may be carried on the PBCH, PCFICH, PHICH, PDCCH, etc. The data may be carried on the PDSCH, etc. The base station transmit processor 920 may process (e.g., encode and symbol map) the data and control information to obtain data symbols and control symbols, respectively. The base station transmit processor 920 may also generate reference symbols, e.g., for the PSS, SSS, and cell-specific reference signal (RS).

A base station transmit (TX) multiple-input multiple-output (MIMO) processor 930 may perform spatial processing (e.g., precoding) on the data symbols, the control symbols, and/or the reference symbols, if applicable, and may provide output symbol streams to the base station modulators/demodulators (MODs/DEMODs) $932_{1-t}$. Each base station modulator/demodulator 932 may process a respective output symbol stream (e.g., for OFDM, etc.) to obtain an output sample stream. Each base station modulator/demodulator 932 may further process (e.g., convert to analog, amplify, filter, and upconvert) the output sample stream to obtain a downlink signal. Downlink signals from modulators/demodulators $932_{1-t}$ may be transmitted via the antennas $934_{1-t}$, respectively.

At the UE 920, the UE antennas $952_{1-r}$ may receive the downlink signals from the base station 910 and may provide received signals to the UE modulators/demodulators (MODs/DEMODs) $954_{1-r}$, respectively. Each UE modulator/demodulator 954 may condition (e.g., filter, amplify, downconvert, and digitize) a respective received signal to obtain input samples. Each UE modulator/demodulator 954 may further process the input samples (e.g., for OFDM, etc.) to obtain received symbols. A UE MIMO detector 956 may obtain received symbols from all the UE modulators/demodulators $954_{1-r}$, and perform MIMO detection on the received symbols if applicable, and provide detected symbols. A UE reception processor 958 may process (e.g., demodulate, deinterleave, and decode) the detected symbols, provide decoded data for the UE 920 to a UE data sink 960, and provide decoded control information to a UE controller/processor 980.

On the uplink, at the UE 920, a UE transmit processor 964 may receive and process data (e.g., for the PUSCH) from a UE data source 962 and control information (e.g., for the PUCCH) from the UE controller/processor 980. The UE transmit processor 964 may also generate reference symbols for a reference signal. The symbols from the UE transmit processor 964 may be precoded by a UE TX MIMO processor 966 if applicable, further processed by the UE modulator/demodulators 954$_{1-r}$ (e.g., for SC-FDM, etc.), and transmitted to the base station 910. At the base station 910, the uplink signals from the UE 920 may be received by the base station antennas 934, processed by the base station modulators/demodulators 932, detected by a base station MIMO detector 936 if applicable, and further processed by a base station reception processor 938 to obtain decoded data and control information sent by the UE 920. The base station reception processor 938 may provide the decoded data to a base station data sink 946 and the decoded control information to the base station controller/processor 940.

The base station controller/processor 940 and the UE controller/processor 380 may direct the operation at the base station 910 and the UE 920, respectively. The base station controller/processor 940 and/or other processors and modules at the base station 910 may perform or direct, e.g., the execution of various processes for the techniques described herein. The UE controller/processor 980 and/or other processors and modules at the UE 920 may also perform or direct, e.g., the execution of the functional blocks illustrated in FIGS. 6 and 7 and/or other processes for the techniques described herein. The base station memory 342 and the UE memory 982 may store data and program codes for the base station 910 and the UE 920, respectively. A scheduler 944 may schedule UEs 920 for data transmission on the downlink and/or uplink.

In one configuration, the base station 910 may include means for generating a compact Downlink Control Information (DCI) for at least one of uplink (UL) or downlink (DL) transmissions, wherein the compact DCI comprises a reduced number of bits when compared to certain standard DCI formats; and means for transmitting the DCI. In one aspect, the aforementioned means may be the base station controller/processor 940, the base station memory 942, the base station transmit processor 920, the base station modulators/demodulators 932, and the base station antennas 934 configured to perform the functions recited by the aforementioned means. In another aspect, the aforementioned means may be a module or any apparatus configured to perform the functions recited by the aforementioned means.

In one configuration, the UE 920 may include means for receiving compact Downlink Control Information (DCI) for at least one of uplink (UL) or downlink (DL) transmissions, wherein the DCI comprises a reduced number of bits of a standard DCI format; and means for processing the DCI. In one aspect, the aforementioned means may be the UE controller/processor 980, the UE memory 982, the UE reception processor 958, the UE MIMO detector 956, the UE modulators/demodulators 954, and the UE antennas 952 configured to perform the functions recited by the aforementioned means. In another aspect, the aforementioned means may be a module or any apparatus configured to perform the functions recited by the aforementioned means.

Figure 9:
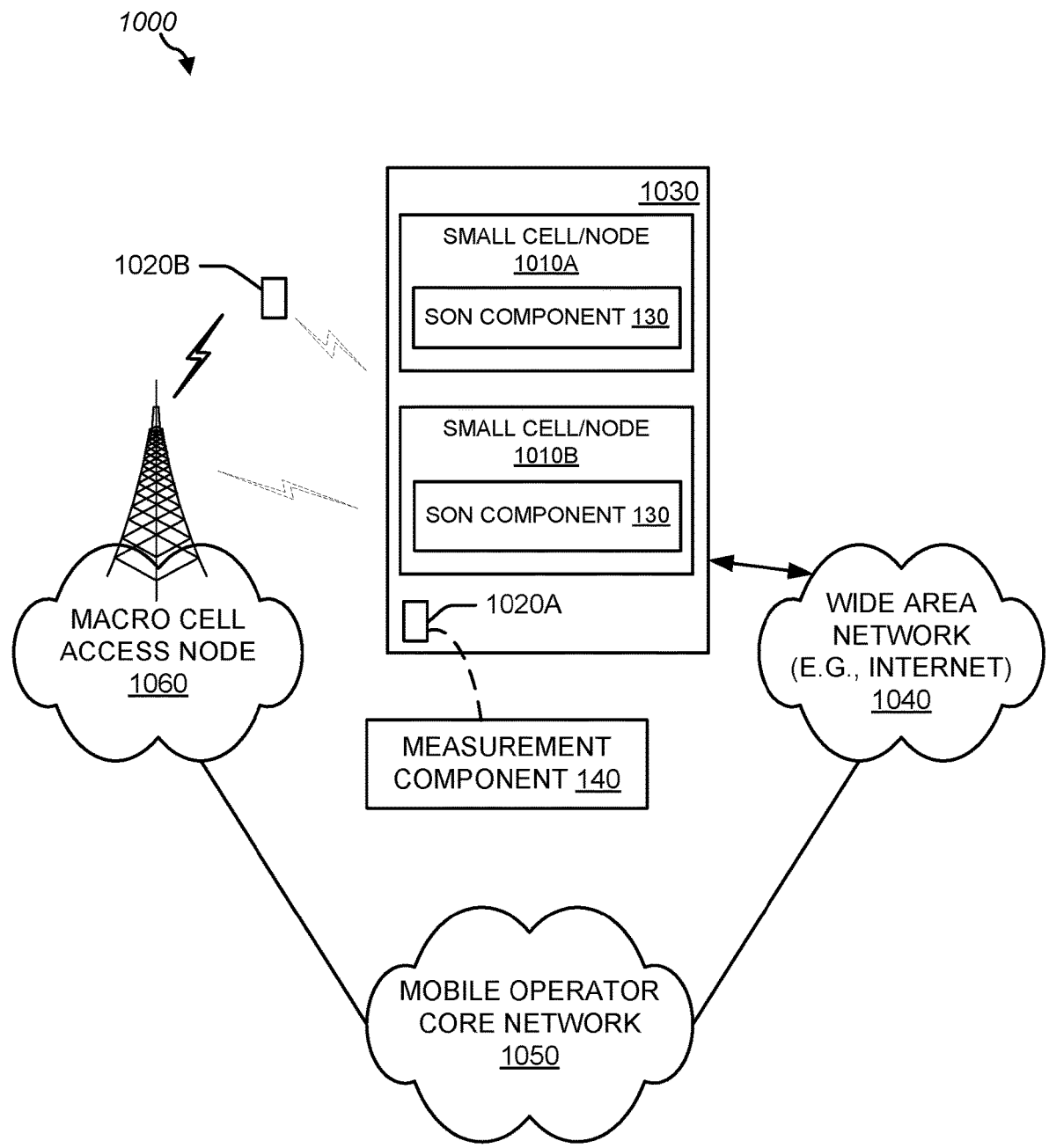
FIG. 9 illustrates an example communication system to enable deployment of small cells/nodes including an aspect of the SON component within a network environment including one or more user equipments including an aspect of the measurement component described herein, e.g., according to FIG. 1.

FIG. 9 illustrates an example communication system 1000 where one or more small cells are deployed within a network environment. Specifically, the system 1000 includes multiple small cells 1010 (e.g., small cells or HNB 1010A and 1010B) and installed in a relatively small scale network environment (e.g., in one or more user residences 1030), wherein the small cells 1010 may be the same as or similar to small cell 110y (FIG. 1) including SON component 130 (FIG. 1). Each small cell 1010 may be coupled to a wireless local area network and/or a wide area network 1040 (e.g., the Internet) and a mobile operator core network 1050 via a routing device, a cable modem, a wireless link, or other connectivity means (not shown).

As described herein, each small cell 1010 may be configured to serve associated access terminals 1020, each of which may include measurement component 140 (FIG. 1) (e.g., access terminal 1020A) and, optionally, alien access terminals 1020 (e.g., access terminal 1020B), both of which may be the same as or similar to UEs 120 (FIG. 1). In other words, access to small cells 1010 may be restricted whereby a given access terminal 1020 may be served by a set of designated (e.g., home) small cell(s) 1010 but may or may not be served by any non-designated small cells 1010 (e.g., a neighboring small cell).

Figure 10:
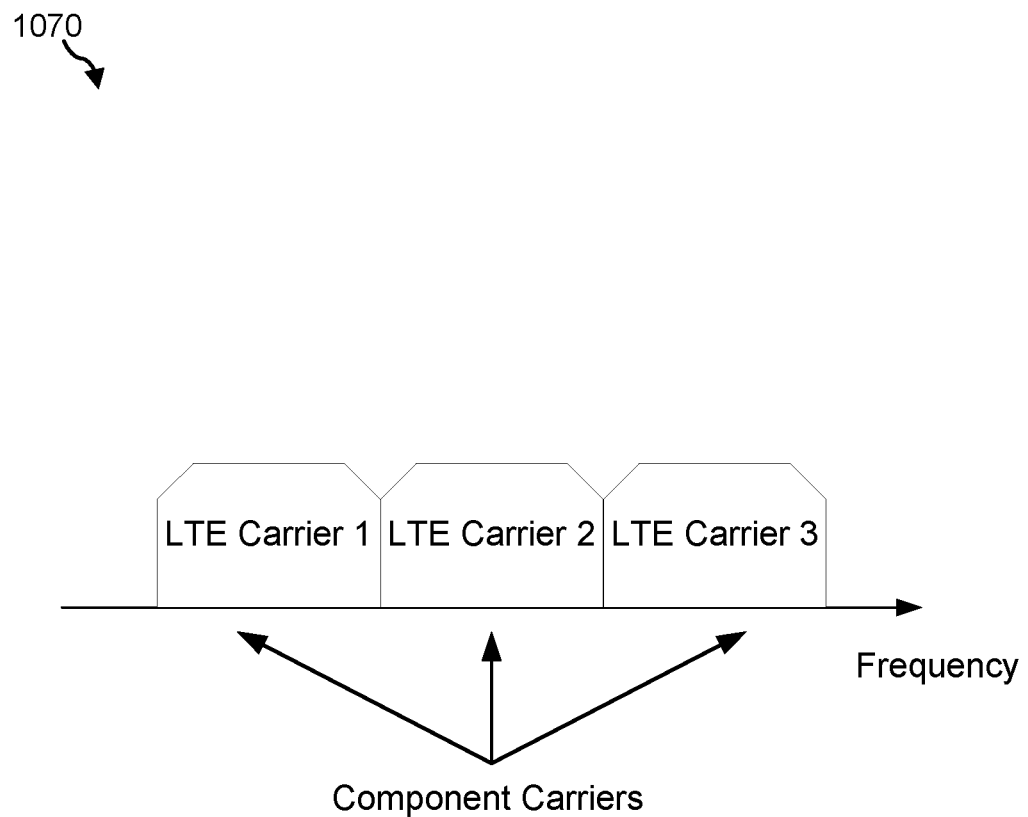
FIG. 10 illustrates an aspect of a continuous carrier aggregation type in accordance with an aspect of the present disclosure, e.g., according to FIG. 1.
Figure 11:
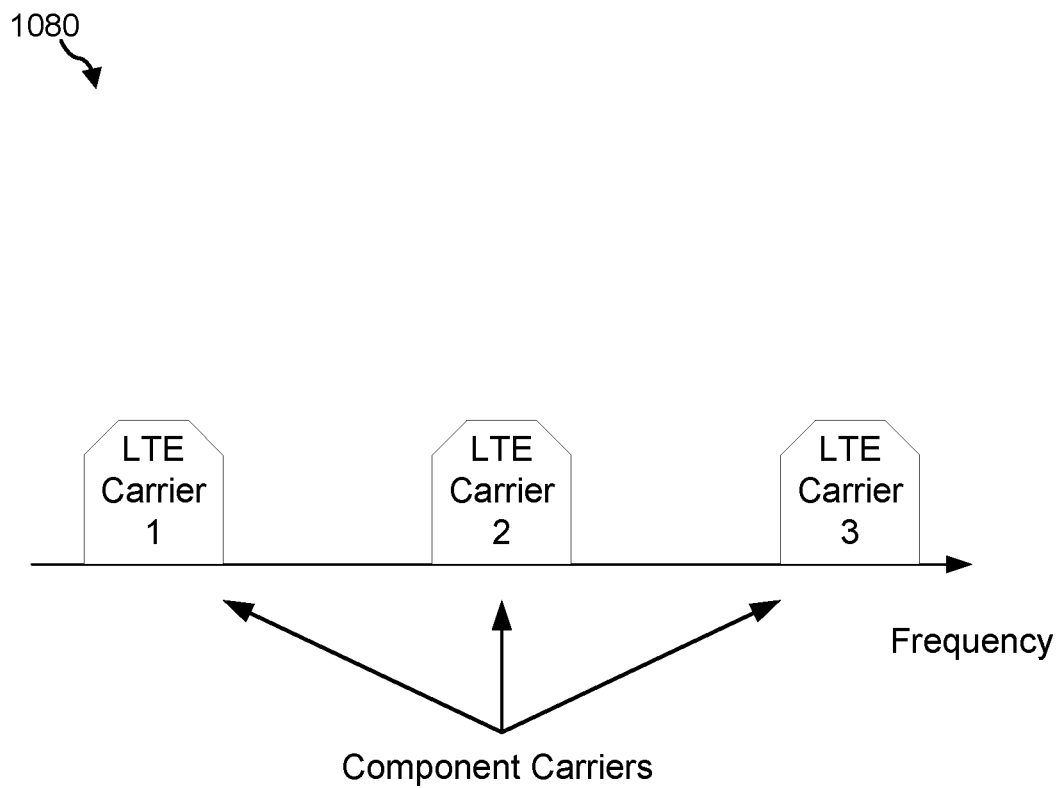
FIG. 11 illustrates an aspect of a non-continuous carrier aggregation type in accordance with an aspect of the present disclosure, e.g., according to FIG. 1.

UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA, which are illustrated in FIGS. 9 and 10, respectively. Continuous CA occurs when multiple available component carriers are adjacent to each other (as illustrated in FIG. 9). On the other hand, non-continuous CA occurs when multiple non-adjacent available component carriers are separated along the frequency band (as illustrated in FIG. 10). It should be understood that any one or more small cells (e.g., network entities), including small cell 110y, illustrated in FIG. 1 may communicate or facilitate communication with one or more UEs (e.g., UE 120y, FIG. 1) according to the aspects set forth with regard to FIGS. 10 and 11.

Both continuous CA 1070 (FIG. 10) and non-continuous CA 1080 (FIG. 11) may aggregate multiple component carriers to serve a single unit of LTE-Advanced UEs. In various examples, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support may be referred to as "associated secondary carriers." For example, the UE may aggregate control functions such as those provided by the optional dedicated channel (DCH), the nonscheduled grants, a physical uplink control channel (PUCCH), and/or a physical downlink control channel (PDCCH).

LTE-A standardization may require carriers to be backward-compatible, to enable a smooth transition to new releases. However, backward-compatibility may require the carriers to continuously transmit common reference signals (CRS), also may be referred to as (cell-specific reference signals) in every subframe across the bandwidth. Most cell site energy consumption may be caused by the power amplifier since the cell remains on even when only limited control signalling is being transmitted, causing the amplifier to continuously consume energy. CRS were introduced in release 8 of LTE standard and may be referred to as LTE's most basic downlink reference signal.

For example, CRS may be transmitted in every resource block in the frequency domain and in every downlink subframe. CRS in a cell can be for one, two, or four corresponding antenna ports. CRS may be used by remote terminals to estimate channels for coherent demodulation. A new carrier type may allow temporarily switching off of cells by removing transmission of CRS in four out of five subframes. This reduces power consumed by the power amplifier. It also may reduce the overhead and interference from CRS since the CRS won't be continuously transmitted in every subframe across the bandwidth. In addition, the new carrier type may allow the downlink control channels to be operated using UE-specific demodulation reference symbols. The new carrier type might be operated as a kind of extension carrier along with another LTE/LTE-A carrier or alternatively as standalone non-backward compatible carrier.

Figure 12:
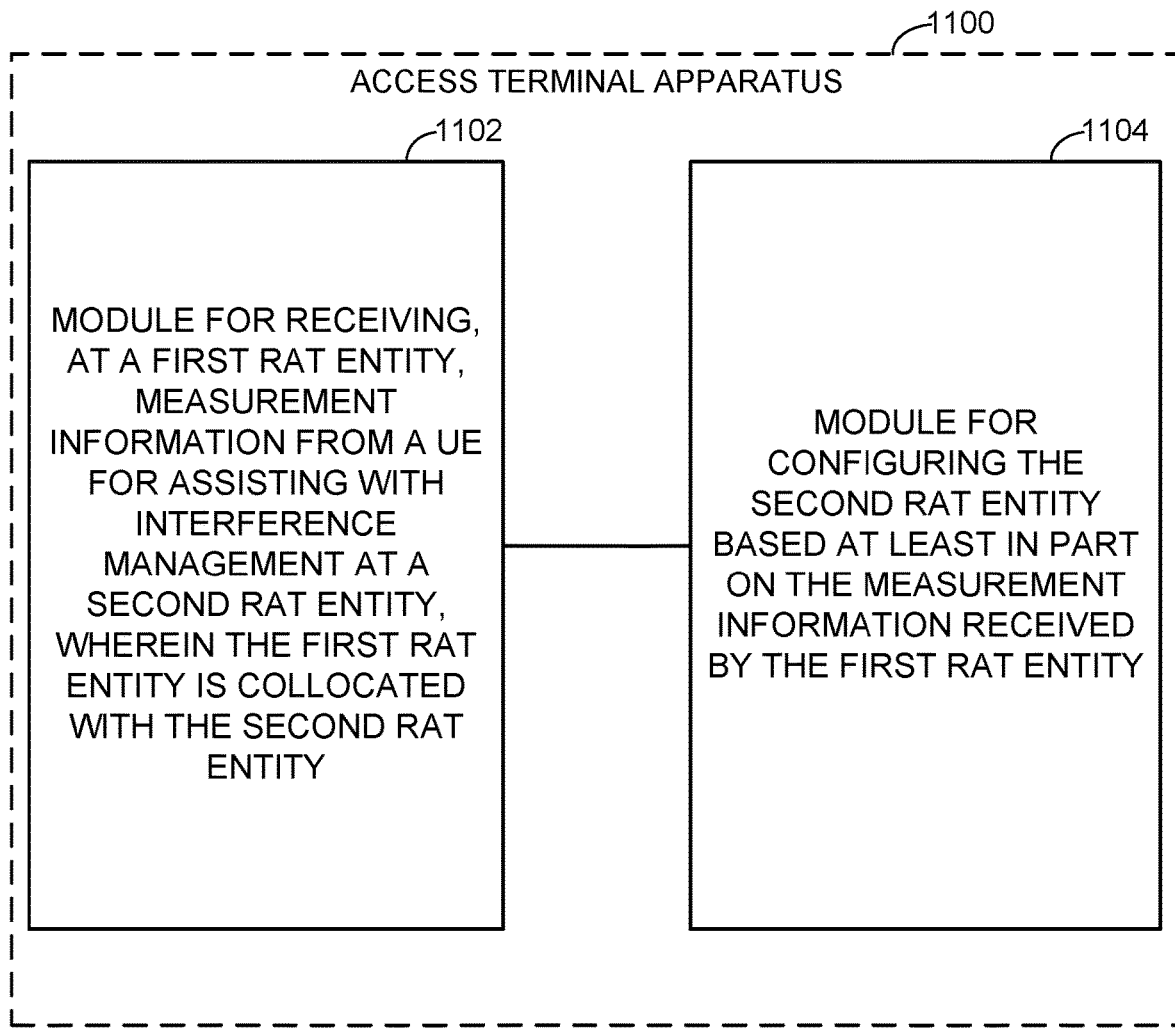
FIGS. 12-15 are block diagrams each illustrating an example of several aspects of apparatuses configured to support communication as taught herein.

FIG. 12 illustrates an example access terminal apparatus 1100 represented as a series of interrelated functional modules), wherein the access terminal apparatus 1100 may be the same as or similar to small cell 110$y$ (FIG. 1) including SON component 130 (FIG. 1). In an aspect, access terminal apparatus 1100 includes a module 1102 for receiving, at a first radio access technology (RAT) entity, measurement information from a user equipment (UE) for assisting with interference management at a second RAT entity, wherein the first RAT entity is collocated with the second RAT entity. Module 1102 may correspond to, for example, a processing system as discussed herein. Further, in an aspect, access terminal apparatus 1100 includes a module 1104 for configuring the second RAT entity based at least in part on the measurement information received by the first RAT entity. Module 1104 may correspond to, for example, a processing system as discussed herein.

Figure 13:
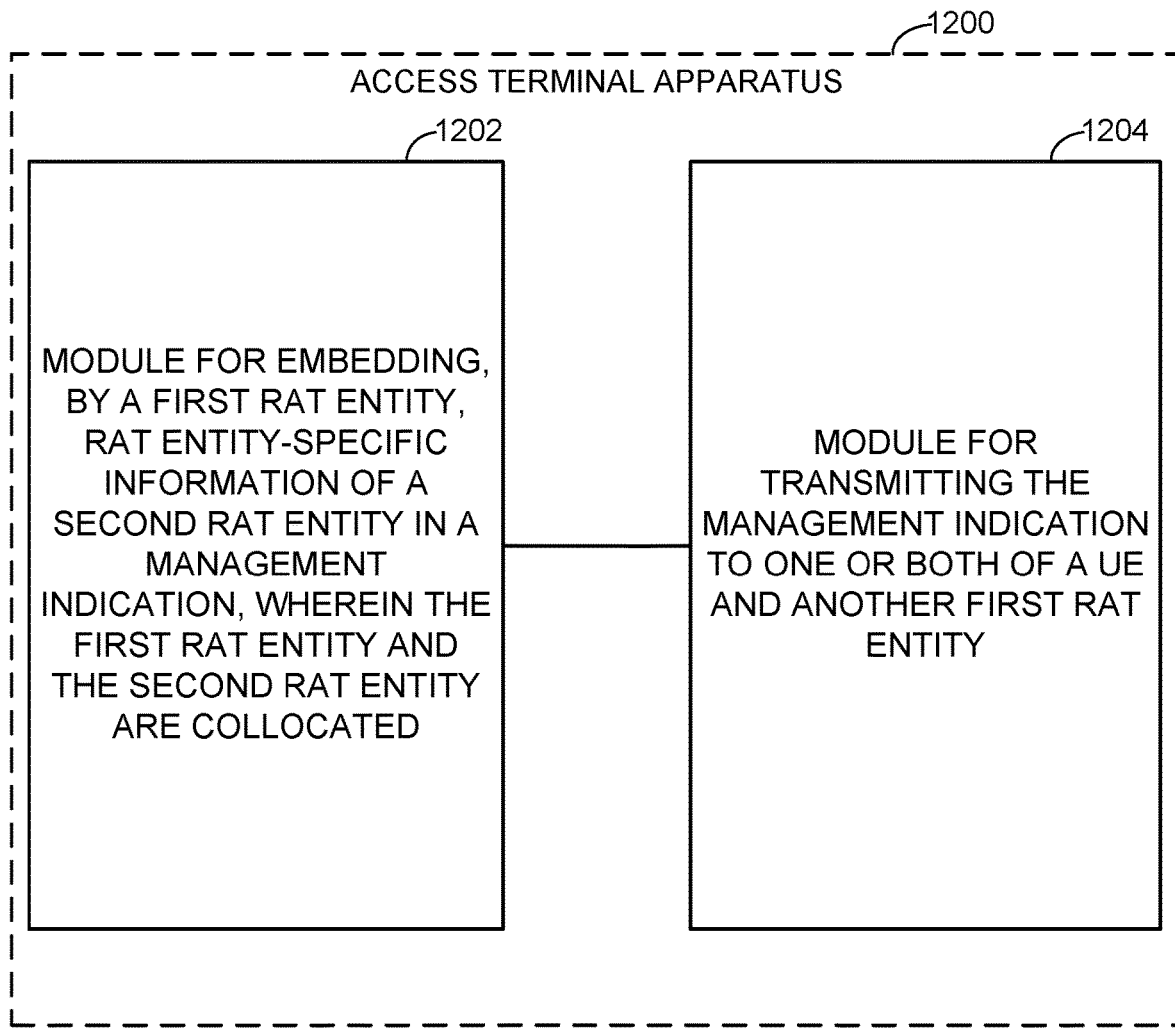

FIG. 13 illustrates an example access terminal apparatus 1200 represented as a series of interrelated functional modules), wherein the access terminal apparatus 1200 may be the same as or similar to small cell 110$y$ (FIG. 1) including SON component 130 (FIG. 1). In an aspect, access terminal apparatus 1200 includes a module 1202 for embedding, by a first RAT entity, RAT entity-specific information of a second RAT entity in a management indication, wherein the first RAT entity and the second RAT entity are collocated. Module 1202 may correspond to, for example, a processing system as discussed herein. Further, in an aspect, access terminal apparatus 1200 includes a module 1204 for transmitting the management indication to one or both of a UE and another first RAT entity. Module 1204 may correspond to, for example, a processing system as discussed herein.

Figure 14:
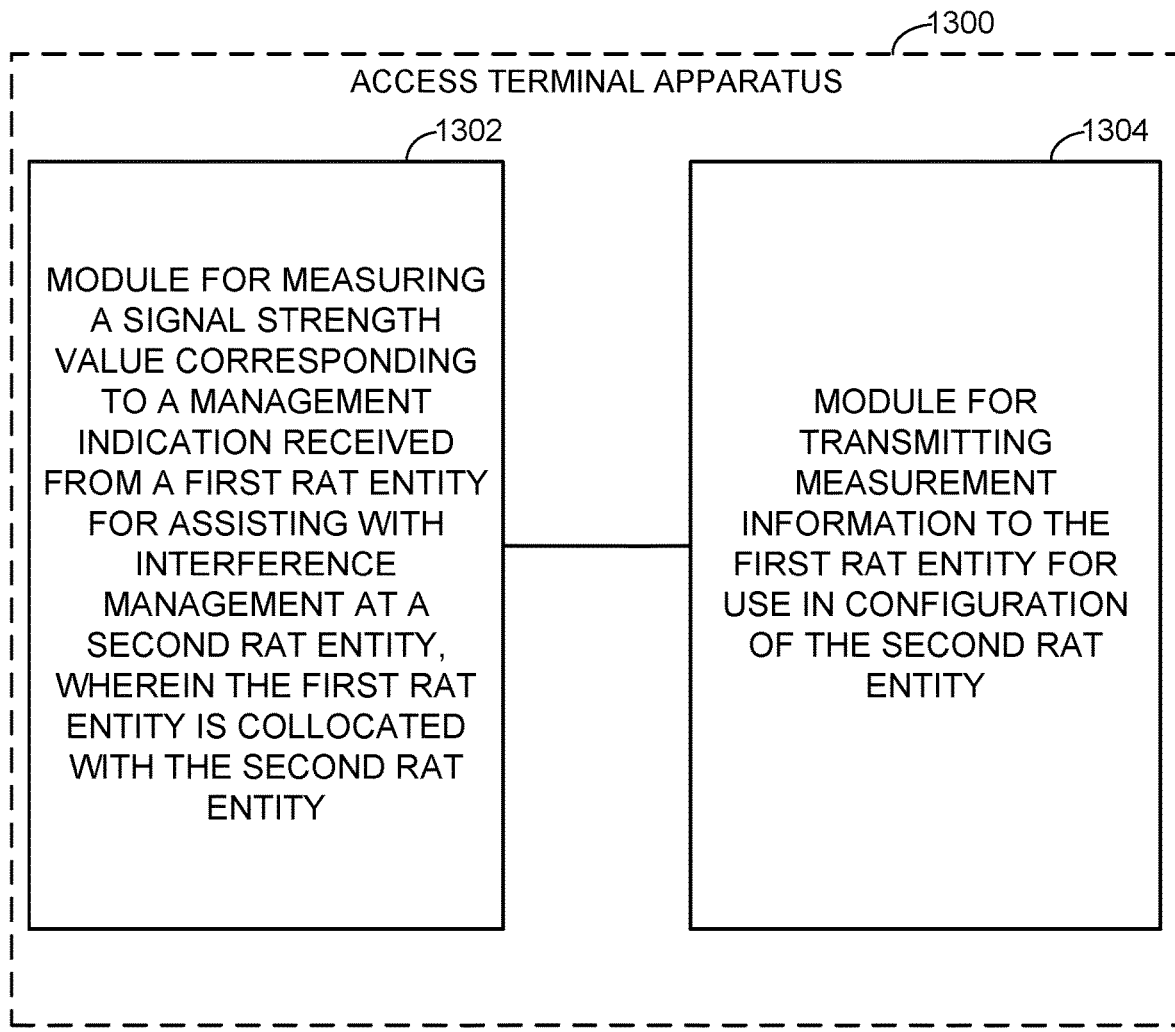

FIG. 14 illustrates an example access terminal apparatus 1300 represented as a series of interrelated functional modules), wherein the access terminal apparatus 1300 may be the same as or similar to UE 120$y$ (FIG. 1) including measurement component 140 (FIG. 1). In an aspect, access terminal apparatus 1300 includes a module 1302 for measuring a signal strength value corresponding to a management indication received from a first RAT entity for assisting with interference management at a second RAT entity, wherein the first RAT entity is collocated with the second RAT entity. Module 1302 may correspond to, for example, a processing system as discussed herein. Further, in an aspect, access terminal apparatus 1300 includes a module 1304 for transmitting measurement information to the first RAT entity for use in configuration of the second RAT entity. Module 1304 may correspond to, for example, a processing system as discussed herein.

Figure 15:
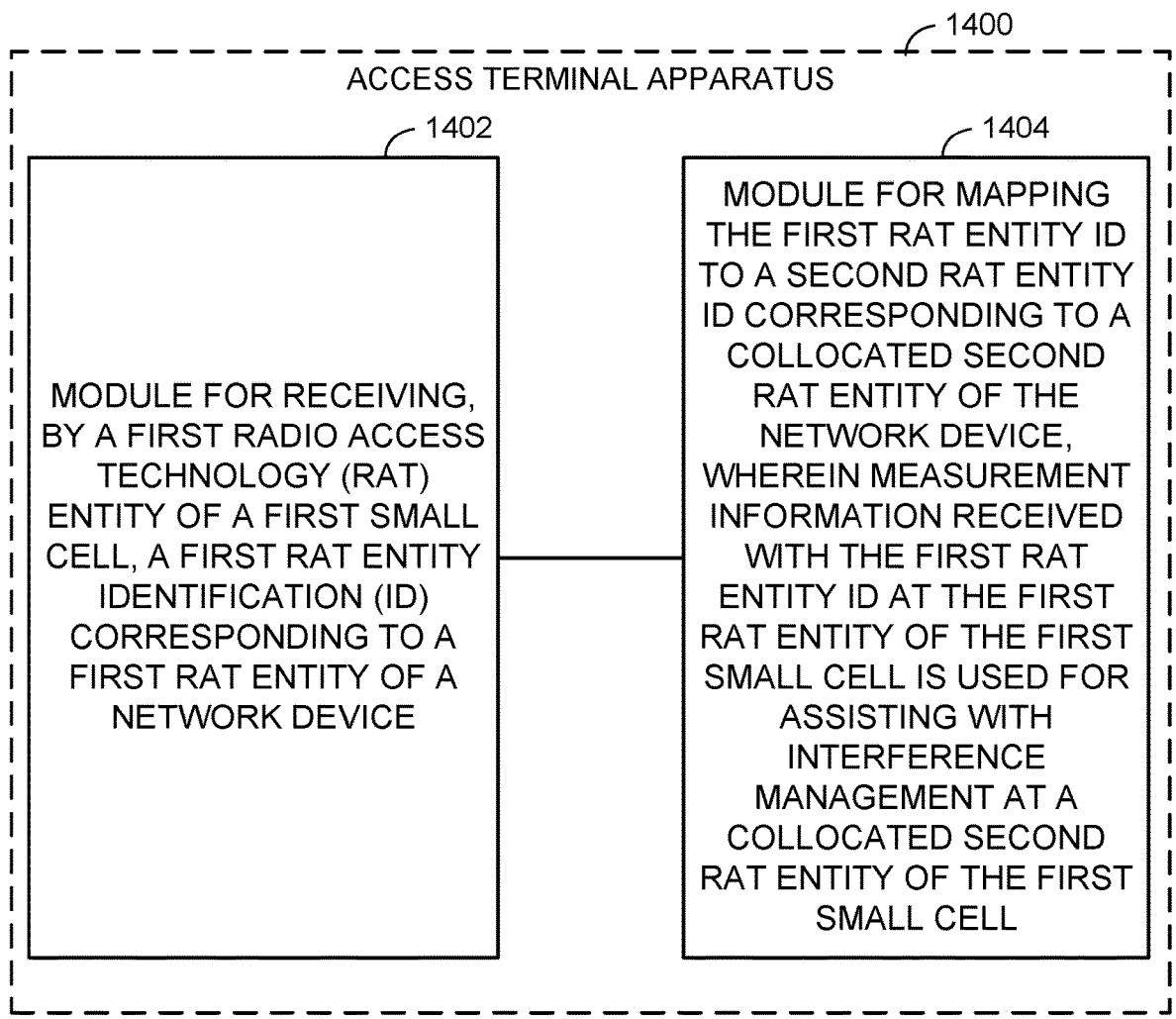

FIG. 15 illustrates an example access terminal apparatus 1400 represented as a series of interrelated functional modules), wherein the access terminal apparatus 1400 may be the same as or similar to UE 120$y$ (FIG. 1) including SON component 130 (FIG. 1). In an aspect, access terminal apparatus 1400 includes a module 1402 for receiving, by a first radio access technology (RAT) entity of a first small cell, a first RAT entity identification (ID) corresponding to a first RAT entity of a network device. Module 1402 may correspond to, for example, a processing system as discussed herein. Further, in an aspect, access terminal apparatus 1400 includes a module for mapping the first RAT entity ID to a second RAT entity ID corresponding to a collocated second RAT entity of the network device, wherein measurement information received with the first RAT entity ID at the first RAT entity of the first small cell is used for assisting with interference management at a collocated second RAT entity of the first small cell. Module 1404 may correspond to, for example, a processing system as discussed herein.

The functionality of the modules of FIGS. 12-15 may be implemented in various ways consistent with the teachings herein. In some aspects, for example, the functionality of these modules may be implemented as one or more electrical components. In some aspects, for example, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module.

In addition, the components and functions represented by FIGS. 12-15 as well as other components and functions described herein, may be implemented using any suitable means. Such means also may be implemented, at least in part, using corresponding structure as taught herein. For example, the components described above in conjunction with the "module" components of FIGS. 12-15 also may correspond to similarly designated "means for" functionality. Thus, in some aspects, one or more of such means may be implemented using one or more of processor components, integrated circuits, or other suitable structure as taught herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of managing interference associated with a configuration of a self-organizing network (SON) during wireless communication, comprising:
   receiving, by a first wireless local area network (WLAN) entity of a user equipment (UE), from a second WLAN entity of a first small cell, a management indication that embeds wireless wide area network (WAN) entity-specific information related to a WAN entity collocated with the second WLAN entity in the first small cell, wherein the management indication comprises a beacon indication comprising one of a service set identifier (SSID) or a basic service set identifier (BSSID) of the second WLAN entity of the first small cell;
   receiving, by the first WLAN entity of the UE, from a third WLAN entity of a second small cell, a probe request indication for triggering transmission of UE measurement information; and
   transmitting, by the first WLAN entity of the UE and responsive to the probe request indication from the second small cell, the management indication comprising the WAN entity-specific information of the WAN entity of the first small cell, to the third WLAN entity of the second small cell.

2. The method of claim 1, wherein the third WLAN entity of the second small cell operates in an unlicensed band.

3. The method of claim 1, wherein the WAN entity-specific information comprises one or more of a load level value, a number of serving UEs, quality of service information, or carrier type information.

4. The method of claim 1, wherein the WAN entity-specific information is embedded in a reserve field of a probe response indication.

5. The method of claim 1, wherein the third WLAN entity comprises a WLAN medium access control (MAC) entity that uses carrier sensing multiple access (CSMA).

6. The method of claim 5, wherein the WLAN MAC entity enables listen-before-talk.

7. An apparatus for managing interference associated with a configuration of a self-organizing network (SON) during wireless communication, comprising:
   a first wireless local area network (WLAN) entity of a user equipment (UE), wherein the first WLAN entity is configured to:
      receive, from a second WLAN entity of a first small cell, a management indication that embeds wireless wide area network (WAN) entity-specific information related to a WAN entity collocated with the second WLAN entity in the first small cell, wherein the management indication comprises a beacon indication comprising one of a service set identifier (SSID) or a basic service set identifier (BSSID) of the second WLAN entity of the first small cell;
      receive, from a third WLAN entity of a second small cell, a probe request indication for triggering transmission of UE measurement information; and
      transmit, responsive to the probe request indication from the second small cell, the management indication comprising the WAN entity-specific information of the WAN entity of the first small cell, to the third WLAN entity of the second small cell.

8. The apparatus of claim 7, wherein the third WLAN entity of the second small cell operates in an unlicensed band.

9. The apparatus of claim 7, wherein the WAN entity-specific information comprises one or more of a load level value, a number of serving UEs, quality of service information, carrier type information, information about cell edge and cell center UEs, mobility related information including hand over frequency, hand over failure rate, radio link failure (RLF) statistics, or information corresponding to whether the WAN entity supports unlicensed band operation.

10. The apparatus of claim 7, wherein the WAN entity-specific information is embedded in a reserve field of a probe response indication.

11. The apparatus of claim 7, wherein the third WLAN entity comprises a WLAN medium access control (MAC) entity that uses carrier sensing multiple access (CSMA).

12. The apparatus of claim 11, wherein the WLAN MAC entity enables listen-before-talk.

13. A non-transitory computer-readable medium storing computer executable code for managing interference associated with a configuration of a self-organizing network (SON) during wireless communication, comprising:
    code for receiving, by a first wireless local area network (WLAN) entity of a user equipment (UE), from a second WLAN entity of a first small cell, a management indication that embeds wireless wide area network (WAN) entity-specific information related to a WAN entity collocated with the second WLAN entity in the first small cell, wherein the management indication comprises a beacon indication comprising one of a service set identifier (SSID) or a basic service set identifier (BSSID) of the second WLAN entity of the first small cell;
    code for receiving, by the first WLAN entity of the UE, from a third WLAN entity of a second small cell, a probe request indication for triggering transmission of UE measurement information; and
    code for transmitting, by the first WLAN entity of the UE and responsive to the probe request indication from the second small cell, the management indication comprising the WAN entity-specific information of the WAN entity of the first small cell, to the third WLAN entity of the first small cell.

14. The non-transitory computer-readable medium of claim 13, wherein the third WLAN entity of the second small cell operates in an unlicensed band.

15. The non-transitory computer-readable medium of claim 13, wherein the WAN entity-specific information comprises one or more of a load level value, a number of serving UEs, quality of service information, or carrier type information.

16. The non-transitory computer-readable medium of claim 13, wherein the WAN entity-specific information is embedded in a reserve field of a probe response indication.

17. The non-transitory computer-readable medium of claim 13, wherein the third WLAN entity comprises a WLAN medium access control (MAC) entity that uses carrier sensing multiple access (CSMA).

18. The non-transitory computer-readable medium of claim 17, wherein the WLAN MAC entity enables listen-before-talk.

19. An apparatus for managing interference associated with a configuration of a self-organizing network (SON) during wireless communication, comprising:
    means for receiving, by a first wireless local area network (WLAN) entity of a user equipment (UE), from a second WLAN entity of a first small cell, a management indication that embeds wireless wide area network (WAN) entity-specific information related to a WAN entity collocated with the second WLAN entity in the first small cell, wherein the management indication comprises a beacon indication comprising one of a service set identifier (SSID) or a basic service set identifier (BSSID) of the second WLAN entity of the first small cell;
    means for receiving, by the first WLAN entity of the UE, from a third WLAN entity of a second small cell, a probe request indication for triggering transmission of UE measurement information; and
    means for transmitting, by the first WLAN entity of the UE and responsive to the probe request indication from the second small cell, the management indication comprising the WAN entity-specific information of the WAN entity of the first small cell, to the third WLAN entity of the second small cell.

20. The apparatus of claim 19, wherein the third WLAN entity of the second small cell operates in an unlicensed band.

21. The apparatus of claim 19, wherein the WAN entity-specific information comprises one or more of a load level value, a number of serving UEs, quality of service information, or carrier type information.

22. The apparatus of claim 19, wherein the WAN entity-specific information is embedded in a reserve field of a probe response indication.

23. The apparatus of claim 19, wherein the third WLAN entity comprises a WLAN medium access control (MAC) entity that uses carrier sensing multiple access (CSMA).

24. The apparatus of claim 23, wherein the WLAN MAC entity enables listen-before-talk.

* * * * *